United States Patent
Wei et al.

(10) Patent No.: US 10,974,198 B2
(45) Date of Patent: Apr. 13, 2021

(54) DIESEL OXIDATION CATALYST COMPRISING PLATINUM GROUP METAL NANOPARTICLES

(71) Applicant: BASF Corporation, Florham Park, NJ (US)

(72) Inventors: Xinyi Wei, Princeton, NJ (US); Xiaoming Xu, Edison, NJ (US); Stanley Roth, Yardley, PA (US)

(73) Assignee: BASF Corporation, Florham Park, NJ (US)

( * ) Notice: Subject to any disclaimer, the term of this patent is extended or adjusted under 35 U.S.C. 154(b) by 48 days.

(21) Appl. No.: 16/068,418

(22) PCT Filed: Jan. 5, 2017

(86) PCT No.: PCT/IB2017/050039
§ 371 (c)(1),
(2) Date: Jul. 6, 2018

(87) PCT Pub. No.: WO2017/118932
PCT Pub. Date: Jul. 13, 2017

(65) Prior Publication Data
US 2019/0015781 A1    Jan. 17, 2019

Related U.S. Application Data

(60) Provisional application No. 62/275,434, filed on Jan. 6, 2016.

(51) Int. Cl.
| | | |
|---|---|---|
| *B01J 21/04* | (2006.01) | |
| *B01J 21/06* | (2006.01) | |
| *B01J 21/08* | (2006.01) | |
| *B01J 21/12* | (2006.01) | |
| *B01J 23/10* | (2006.01) | |
| *B01J 23/38* | (2006.01) | |
| *B01J 23/40* | (2006.01) | |
| *B01J 23/42* | (2006.01) | |
| *B01J 23/44* | (2006.01) | |

(Continued)

(52) U.S. Cl.
CPC .......... *B01D 53/944* (2013.01); *B01D 53/86* (2013.01); *B01J 23/42* (2013.01); *B01J 35/006* (2013.01);
(Continued)

(58) Field of Classification Search
CPC . B01J 21/04; B01J 21/06; B01J 21/063; B01J 21/066; B01J 21/08; B01J 21/12;
(Continued)

(56) References Cited

U.S. PATENT DOCUMENTS 7,381,683 B1 *  6/2008  Wang ................... B01D 53/864
                                              502/326
7,838,461 B2 * 11/2010  Komatsu .................. B01J 23/42
                                              502/325

(Continued)

FOREIGN PATENT DOCUMENTS

| EP | 1493484 | 1/2005 |
|---|---|---|
| JP | 2015073936 A | 4/2015 |

(Continued)

OTHER PUBLICATIONS

Boubnov et al., "Structure-Activity Relationships of Pt/Al$_2$O$_3$ Catalysts for CO and NO Oxidation at Diesel Exhaust Conditions" *Applied Catalysis B: Environmental*, 2012, vol. 126, pp. 315-325.
(Continued)

*Primary Examiner* — Cam N. Nguyen
(74) *Attorney, Agent, or Firm* — Finnegan Henderson Farabow Garrett & Dunner LLP

(57) ABSTRACT

The present invention relates to diesel oxidation catalyst compositions and catalyst articles, wherein the compositions and articles include a plurality of platinum group nanoparticles substantially in fully reduced form, wherein the nanoparticles have an average particle size of about 1 to about 10 nm and at least about 90% of the nanoparticles have a (Continued)

particle size of +/- about 2 nm of the average particle size. Such compositions can further include a refractory metal oxide material, wherein the nanoparticles and refractory metal oxide material can be combined within the same coating on a substrate or can be applied sequentially on a substrate. The nanoparticles can advantageously be substantially free of halides, alkali metals, alkaline earth metals, sulfur compounds, and boron compounds. Methods of preparing and using such compositions and catalyst articles (e.g., for the treatment of diesel exhaust gas streams) are also provided herein.

42 Claims, 11 Drawing Sheets

(51) Int. Cl.

| | |
|---|---|
| B01J 23/46 | (2006.01) |
| B01J 23/48 | (2006.01) |
| B01J 23/50 | (2006.01) |
| B01J 23/52 | (2006.01) |
| B01J 23/54 | (2006.01) |
| B01J 23/56 | (2006.01) |
| B01J 23/63 | (2006.01) |
| B01J 23/66 | (2006.01) |
| B01J 35/00 | (2006.01) |
| B01J 35/04 | (2006.01) |
| B01J 37/02 | (2006.01) |
| B01J 37/08 | (2006.01) |
| B01J 37/10 | (2006.01) |
| B01J 37/16 | (2006.01) |
| F01N 3/10 | (2006.01) |
| B01D 53/86 | (2006.01) |
| B01D 53/94 | (2006.01) |
| B82Y 30/00 | (2011.01) |
| B82Y 40/00 | (2011.01) |

(52) U.S. Cl.
CPC .......... *B01J 35/0013* (2013.01); *B01J 35/04* (2013.01); *B01J 37/0211* (2013.01); *B01J 37/0215* (2013.01); *B01J 37/08* (2013.01); *B01J 37/10* (2013.01); *B01J 37/16* (2013.01); *F01N 3/103* (2013.01); *F01N 3/108* (2013.01); *B01D 2255/102* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/9202* (2013.01); *B01D 2255/9205* (2013.01); *B01D 2258/012* (2013.01); *B01J 2523/00* (2013.01); *B01J 2523/41* (2013.01); *B01J 2523/47* (2013.01); *B01J 2523/821* (2013.01); *B01J 2523/822* (2013.01); *B01J 2523/824* (2013.01); *B01J 2523/825* (2013.01); *B01J 2523/827* (2013.01); *B01J 2523/828* (2013.01); *B82Y 30/00* (2013.01); *B82Y 40/00* (2013.01)

(58) Field of Classification Search
CPC ... B01J 23/10; B01J 23/38; B01J 23/40; B01J 23/42; B01J 23/44; B01J 23/46; B01J 23/48; B01J 23/50; B01J 23/52; B01J 23/54; B01J 23/56; B01J 23/63; B01J 23/66; B01J 35/0013; B01J 35/006; B01J 35/04; B01J 37/0211; B01J 37/0215; B01J 37/08; B01J 37/10; B01J 37/16; F01N 3/103; F01N 3/108; B01D 53/86; B01D 53/944

See application file for complete search history.

(56) References Cited

U.S. PATENT DOCUMENTS

| | | | | |
|---|---|---|---|---|
| 7,955,570 B2* | 6/2011 | Insley | ............... | B01D 53/864 |
| | | | | 422/177 |
| 7,989,384 B2* | 8/2011 | Brey | ............... | B01J 37/0238 |
| | | | | 502/184 |
| 8,058,202 B2* | 11/2011 | Brady | ............... | B01D 53/864 |
| | | | | 502/184 |
| 8,314,048 B2* | 11/2012 | Brey | ............... | B01J 37/349 |
| | | | | 502/344 |
| 8,618,020 B2* | 12/2013 | Brey | ............... | A62D 9/00 |
| | | | | 502/344 |
| 8,664,148 B2* | 3/2014 | Brey | ............... | B82Y 30/00 |
| | | | | 502/344 |
| 8,900,420 B2* | 12/2014 | Veeraraghavan | ...... | B01J 35/006 |
| | | | | 204/192.15 |
| 9,084,988 B2* | 7/2015 | Osaki | ............... | B01J 35/0013 |
| 9,156,025 B2* | 10/2015 | Qi | ............... | B01J 37/0228 |
| 9,272,268 B2* | 3/2016 | Toops | ............... | B01J 23/8926 |
| 9,352,300 B2* | 5/2016 | Barrett | ............... | B82Y 30/00 |
| 9,511,352 B2* | 12/2016 | Qi | ............... | B01J 21/04 |
| 9,616,409 B2* | 4/2017 | David | ............... | B01J 23/44 |
| 9,687,811 B2* | 6/2017 | Biberger | ............... | B01J 20/02 |
| 9,795,946 B2* | 10/2017 | Mendoza Gomez | ............... | B01J 37/0219 |
| 9,901,907 B1* | 2/2018 | Xiao | ............... | B01D 53/944 |
| 10,182,276 B2* | 1/2019 | Dahlfort | ............. | H04J 14/0283 |
| 10,183,276 B2* | 1/2019 | Karpov | ............... | B01J 35/008 |
| 10,201,804 B2* | 2/2019 | Karpov | ............... | B01J 35/1014 |
| 10,537,879 B2* | 1/2020 | Bergeal | ............... | B01J 37/16 |
| 2008/0206562 A1* | 8/2008 | Stucky | ............... | B01J 23/74 |
| | | | | 428/403 |
| 2009/0011293 A1* | 1/2009 | Wood | ............... | B01J 35/1061 |
| | | | | 429/479 |
| 2010/0311571 A1* | 12/2010 | Rinaldi | ............... | B01J 37/0248 |
| | | | | 502/80 |
| 2011/0280780 A1* | 11/2011 | Brey | ............... | A62D 3/38 |
| | | | | 423/247 |
| 2013/0034472 A1* | 2/2013 | Cantrell | ............. | B01D 53/9422 |
| | | | | 422/177 |
| 2013/0172177 A1* | 7/2013 | Domke | ............... | B01J 37/16 |
| | | | | 502/242 |
| 2013/0217566 A1 | 8/2013 | Wang et al. | | |
| 2014/0038814 A1* | 2/2014 | David | ............... | B01J 37/16 |
| | | | | 502/330 |
| 2014/0044627 A1 | 2/2014 | Siani et al. | | |
| 2014/0140909 A1* | 5/2014 | Qi | ............... | B01J 37/0228 |
| | | | | 423/212 |
| 2014/0328726 A1 | 11/2014 | Osaki et al. | | |
| 2015/0140317 A1* | 5/2015 | Biberger | ............... | B01J 37/0018 |
| | | | | 428/317.9 |
| 2015/0217229 A1 | 8/2015 | Yin et al. | | |
| 2015/0231610 A1 | 8/2015 | Sakurai et al. | | |
| 2017/0354962 A1* | 12/2017 | D'Souza | ............... | B01J 37/16 |
| 2018/0056276 A1* | 3/2018 | Xiao | ............... | B01J 23/44 |
| 2018/0311651 A1* | 11/2018 | Ravon | ............... | B01J 37/0201 |
| 2019/0126247 A1* | 5/2019 | Deeba | ............... | B01J 35/002 |
| 2019/0160427 A1* | 5/2019 | Deeba | ............... | B01J 21/066 |
| 2019/0388838 A1* | 12/2019 | Luo | ............... | B01J 35/006 |

FOREIGN PATENT DOCUMENTS

| | | |
|---|---|---|
| KR | 20060004880 A | 1/2006 |
| WO | WO 02092224 | 11/2002 |

OTHER PUBLICATIONS

Weiss et al., "No Oxidation Catalysis on Pt Clusters: Elementary Steps, Structural Requirements, and Synergistic Effects of $NO_2$

(56) References Cited

OTHER PUBLICATIONS

Adsorption Sites," *J. Phys. Chem. C*, 2009, vol. 113, pp. 13331-13340.
Winkler et al., "The Influence of Chemical and Thermal Aging on the Catalytic Activity of a Monolithic Diesel Oxidation Catalyst," *Applied Catalysis B. Environmental*, 2009, vol. 93, pp. 177-184.

\* cited by examiner

DIESEL OXIDATION CATALYST COMPRISING PLATINUM GROUP METAL NANOPARTICLES

CROSS-REFERENCE TO RELATED APPLICATIONS

The present application is a U.S. National Stage of International Patent Application PCT/IB2017/050039, filed Jan. 5, 2017 and claims priority to U.S. Provisional Patent Application No. 62/275,434, filed Jan. 6, 2016. The disclosures of each of the applications noted above are incorporated herein by reference in their entirety.

FIELD OF THE INVENTION

The present invention relates to the use of colloidal platinum metal nanoparticles with high platinum metal concentration for diesel oxidation catalyst compositions, methods for the preparation and use of such catalyst compositions, and catalyst articles and systems employing such catalyst compositions.

BACKGROUND OF THE INVENTION

Emissions of diesel engines include particulate matter (PM), nitrogen oxides ($NO_x$), unburned hydrocarbons (HC), and carbon monoxide (CO). $NO_x$ is a term used to describe various chemical species of nitrogen oxides, including nitrogen monoxide (NO) and nitrogen dioxide ($NO_2$), among others. The two major components of exhaust particulate matter are the soluble organic fraction (SOF) and the dry carbon or soot fraction. The SOF condenses on the soot in layers, and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon.

Platinum group metal (PGM) and, in particular, platinum (Pt)-based and platinum/palladium (Pt/Pd)-based catalysts are useful in treating the exhaust of diesel engines to remove hydrocarbon (HC) and carbon monoxide (CO) by catalyzing the oxidation of these pollutants to carbon dioxide ($CO_2$) and water ($H_2O$). In addition, oxidation catalysts that contain platinum promote the oxidation of NO to $NO_2$. Catalysts are typically defined by their light-off temperature or the temperature at which 50% conversion is attained, also called $T_{50}$. Such catalysts may be contained within diesel oxidation catalyst (DOC) systems, catalyst soot filter (CSF) systems, or combined DOC-CSF systems. These catalyst systems are placed in the exhaust flow path from diesel power systems to treat the resulting exhaust before it vents to the atmosphere. Typically, diesel oxidation catalysts are deposited on ceramic or metallic substrates.

Diesel soot removal is achieved via either active or passive regeneration. Active soot regeneration is carried out by injecting additional diesel fuel at the DOC inlet, and the exotherm released by the fuel combustion significantly raises the temperature at a downstream CSF and initiates soot combustion by $O_2$ ($C+O_2 \rightarrow CO/CO_2$). This reaction typically requires temperatures in excess of 600° C. Passive soot regeneration utilizes $NO_2$ rather than $O_2$ to oxidize soot ($C+NO_2 \rightarrow CO/CO_2+NO$). This reaction becomes quite efficient at T>300° C. and can often be accomplished during normal driving, without requiring fuel injection, which results in a fuel penalty. In current heavy-duty diesel vehicles and light-duty diesel vehicles, some manufacturers predominantly utilize passive regeneration strategy for their system design, i.e., high engine-out NOx in combination with low soot emission. However, $NO_2$ typically constitutes <10% of the total engine-out NOx. For maximal passive soot removal, additional $NO_2$ has to be formed by oxidation of NO.

Platinum (Pt) remains the most effective platinum group metal for oxidizing NO to $NO_2$, and the mild aging conditions (~550°) of passive heavy-duty diesel systems render it particularly suitable. Even for light-duty diesel systems where DOC exhaust temperatures can reach 800° C., catalyst designs with Pt-rich zones can be made thermally durable. NO oxidation has been widely reported to be structure-sensitive on Pt, i.e., turn-over frequency (TOF) is strongly dependent on the Pt particle size (B. M. Weiss, E. Iglesia, J. Phys. Chem. C, 2009, 30, 13331-13340). In addition, a fully reduced metallic Pt surface is most active for NO oxidation. There remains a need in the art for new DOC catalyst formulations that meet increasingly stringent regulations. Colloidal platinum group metal nanoparticles (PGMNPs) with high metal content (e.g., high platinum content) would be useful for preparation of such DOC compositions.

SUMMARY OF THE INVENTION

The invention provides a diesel oxidation catalyst (DOC) composition, the composition comprising at least one platinum group metal (PGM) material in reduced nanoparticle form. Catalyst compositions comprising a PGM material in reduced nanoparticle form can provide significantly greater NO to $NO_2$ conversion than comparable catalyst compositions prepared using standard PGM precursors (e.g., soluble PGM complexes).

In one aspect, the present disclosure provides a diesel oxidation catalyst composition, the composition comprising: a plurality of platinum group metal nanoparticles (PGMNPs) selected from the group consisting of Pt, Pd, Au, Ag, Ru, Rh, Ir, Os, alloys thereof, and mixtures thereof, wherein about 90% or more of the platinum group metal is in fully reduced form, wherein the nanoparticles have an average particle size of about 1 to about 10 nm and at least 90% of the nanoparticles have a particle size of +/- about 2 nm of the average particle size; and a refractory metal oxide material. In such compositions, the PGMNPs are advantageously supported on the refractory metal oxide material. In certain embodiments, the composition is substantially free of halides, alkali metals, alkaline earth metals and sulfur compounds. In certain embodiments, the composition is substantially free of boron- and sodium-containing components (e.g., the composition is substantially free of boron and sodium). In some embodiments, the colloidal PGMNP suspension from which the diesel oxidation catalyst composition is prepared is substantially free of halides, alkali metals, alkaline earth metals and sulfur compounds (which can act as catalyst poisons) and, in some embodiments, the suspension is substantially free of boron- and sodium-containing components (e.g., the suspension is substantially free of boron and sodium).

In another aspect, the disclosure provides a diesel oxidation catalyst article, comprising a substrate having at least one coating disposed thereon, wherein the coating comprises a plurality of platinum group metal nanoparticles selected from the group consisting of Pt, Pd, Au, Ag, Ru, Rh, Ir, Os, alloys thereof, and mixtures thereof, wherein about 90% or more of the platinum group metal is in fully reduced form, wherein the nanoparticles have an average particle size of about 1 to about 10 nm and at least 90% of the nanoparticles have a particle size of +/− about 2 nm of the average particle size. In some embodiments, the coating on the substrate further comprises a refractory metal oxide material. In certain other embodiments, the substrate can further comprise a refractory metal oxide layer overlying the substrate and positioned between the substrate and the coating.

Another aspect of the invention provides a method of treating an exhaust stream from a diesel engine, comprising passing the exhaust stream through a diesel oxidation catalyst article as disclosed herein such that NO is oxidized within the catalyst article. The invention further provides a method of treating an exhaust stream from a diesel engine, comprising passing the exhaust stream through a diesel oxidation catalyst article as disclosed herein such that CO, HC, and NO are oxidized within the catalyst article Further, in another aspect, the invention provides methods of making the diesel oxidation catalyst articles disclosed herein (e.g., comprising platinum group metal nanoparticles), wherein the method comprises applying a refractory metal oxide slurry and a colloidal dispersion comprising platinum group metal nanoparticles to a substrate. The method can further comprise calcining the coated substrate after the applying step.

The specific steps of making the catalyst articles can vary. For example, in one embodiment, the method comprises a step of forming a washcoat slurry comprising the refractory metal oxide slurry in water and the colloidal nanoparticle dispersion and applying the refractory metal oxide slurry and the colloidal dispersion to the substrate in the form of the washcoat. In other embodiments, these components may be separately applied to the substrate. For example, in one embodiment, the method comprises the steps of applying the refractory metal oxide slurry to the substrate; calcining the refractory metal oxide coating on the substrate; and thereafter applying the colloidal dispersion overlying the calcined refractory metal oxide coating.

In some embodiments, the disclosed method further comprises aging the diesel oxidation catalyst article by subjecting the article to heat treatment in 10% steam in air at 550° C. for 50 hours or 600° C. for about 20 hours at 1 L/min gas flow, wherein at least about 50% of the PGM particles after aging have diameters of about 1 to 50 nm. This heat treatment step, in some embodiments, advantageously simulates diesel exhaust. The method can further comprise aging the diesel oxidation catalyst article under such conditions, wherein at least about 75% of the PGM particles after aging have diameters of about 1 to 50 nm. In other embodiments, the method can further comprise aging the catalyst under such conditions, wherein at least about 50% of the PGM particles after aging have diameters of about 1 to 25 nm. Accordingly, aged catalyst articles that exhibit such particle sizes are also encompassed herein.

Such methods can, in some embodiments, further comprise preparing the platinum group nanoparticles by a method comprising: a) preparing a solution of platinum group metal precursors selected from salts of Pt, Pd, Au, Ag, Ru, Rh, Ir, Os and alloys thereof in the presence of a dispersion medium and a water soluble polymer suspension stabilizing agent, wherein the platinum group metal precursors are substantially free of halides, alkali metals, alkaline earth metals and sulfur compounds; and b) combining the solution with a reducing agent to provide a platinum group metal nanoparticle colloidal dispersion wherein the nanoparticle concentration is at least about 2 wt. % of the total weight of the colloidal dispersion and wherein at least about 90% of the platinum group metal in the colloidal dispersion is in fully reduced form. The platinum group metal precursors can, in some embodiments, be selected from the group consisting of amine complex salts, hydroxyl salts, nitrates, carboxylic acid salts, ammonium salts, and oxides (e.g., selected from $Pt(NH_3)_4(OH)_2$, $Pd(NH_3)_4(OH)_2$, $Pd(OH)_2$, $Ir(OH)_4$, Rh nitrate, Pt nitrate, Pt citrate, Pd(II) nitrate, and Pd(II) citrate). One exemplary polymer suspension stabilizing agent for use in such methods is polyvinylpyrrolidone, one exemplary reducing agent is ascorbic acid, and one exemplary polar solvent is water.

The disclosure further provides an emission treatment system for treatment of an exhaust gas stream, the emission treatment system comprising: a diesel engine producing an exhaust gas stream; a first catalyst article as disclosed herein positioned in fluid communication with the exhaust gas stream and adapted for oxidation of carbon monoxide and hydrocarbon gases within the exhaust stream to form a treated exhaust gas stream; and at least one additional catalyst article downstream from the first catalyst article and in fluid communication with the treated exhaust gas stream, the at least one additional catalyst article adapted for ammonia oxidation, particulate filtration, $NO_x$ storage, $NO_x$ trapping, selective catalytic reduction of $NO_R$, or combinations thereof.

In certain embodiments of the disclosed diesel oxidation compositions, catalyst articles, systems, and methods, the platinum group metal nanoparticles comprise platinum. The refractory metal oxide is, in some embodiments, selected from the group consisting of alumina, silica, zirconia, titania, ceria, and physical mixtures or chemical combinations thereof. In some embodiments, the refractory metal oxide is a silica-doped alumina, titania, or zirconia, e.g., 1-10% $SiO_2$-doped $Al_2O_3$, 1-10% or 1-20% $SiO_2$-doped $TiO_2$, or 1-30% or 5-30% $SiO_2$-doped $ZrO_2$. In particular embodiments, the refractory metal oxide comprises 1% or 5% $SiO_2$-doped $Al_2O_3$ or 8-14% $SiO_2$-doped $TiO_2$.

It may be desirable that the nanoparticle sizes are substantially monodisperse. In some embodiments, at least about 90% of the nanoparticles have a particle size +/− about 1 nm of the average particle size. In some embodiments, at least about 95% of the nanoparticles have a particle size +/−2 nm of the average particle size, and in some embodiments, at least about 95% of the nanoparticles have a particle size +/− about 1 nm of the average particle size. Thus, the average particle size of the nanoparticles can be controlled to within a narrow range, e.g., with at least 90% or at least 95% of the nanoparticles having a particle size within this range. The average particle size of the nanoparticles can vary. For example, in various embodiments, the average size of the nanoparticles may be about 1 to about 3 nm, about 2 to about 3 nm, about 3 to about 5 nm, about 5 to about 7 nm, or about 7 to about 9 nm. In some embodiments, the nanoparticles have an average particle size of about 1 to about 3 nm and at least 95% of the nanoparticles have a particle size within this range. In some embodiments, the nanoparticles have an average particle size of about 1 to about 5 nm and at least 95% of the nanoparticles have a particle size within this range. At least 95% of the nanoparticles in some of the compositions and articles disclosed herein can, in some embodiments, have a particle size of within 50 percent of the average particle size.

The invention includes, without limitation, the following embodiments.

Embodiment 1

A diesel oxidation catalyst composition, the composition comprising: a plurality of platinum group metal nanoparticles selected from the group consisting of Pt, Pd, Au, Ag, Ru, Rh, Ir, Os, alloys thereof, and mixtures thereof, wherein about 90% or more of the platinum group metal is in fully reduced form, wherein the nanoparticles have an average particle size of about 1 to about 10 nm and at least about 90% of the nanoparticles have a particle size of +/− about 2 nm of the average particle size; and, optionally, a refractory metal oxide material.

Embodiment 2

The diesel oxidation catalyst composition of any preceding or subsequent embodiment, wherein at least about 90% of the nanoparticles have a particle size +/− about 1 nm of the average particle size.

Embodiment 3

The diesel oxidation catalyst composition of any preceding or subsequent embodiment, wherein at least about 95% of the nanoparticles have a particle size +/−2 nm of the average particle size.

Embodiment 4

The diesel oxidation catalyst composition of any preceding or subsequent embodiment, wherein at least about 95% of the nanoparticles have a particle size +/− about 1 nm of the average particle size.

Embodiment 5

The diesel oxidation catalyst composition of any preceding or subsequent embodiment, wherein the average particle size of the nanoparticles is about 2 to about 3 nm.

Embodiment 6

The diesel oxidation catalyst composition of any preceding or subsequent embodiment, wherein the average particle size of the nanoparticles is about 3 to about 5 nm.

Embodiment 7

The diesel oxidation catalyst composition of any preceding or subsequent embodiment, wherein the average particle size of the nanoparticles is about 5 to about 7 nm.

Embodiment 8

The diesel oxidation catalyst composition of any preceding or subsequent embodiment, wherein the average particle size of the nanoparticles is about 7 to about 9 nm.

Embodiment 9

The diesel oxidation catalyst composition of any preceding or subsequent embodiment, wherein the composition is substantially free of halides, alkali metals, alkaline earth metals, sulfur compounds, and boron compounds.

Embodiment 10

The diesel oxidation catalyst composition of any preceding or subsequent embodiment, wherein the composition is substantially free of boron and sodium.

Embodiment 11

The diesel oxidation catalyst composition of any preceding or subsequent embodiment, wherein the platinum group metal nanoparticles comprise platinum.

Embodiment 12

The diesel oxidation catalyst composition of any preceding or subsequent embodiment, wherein the refractory metal oxide is selected from the group consisting of alumina, silica, zirconia, titania, ceria, and physical mixtures or chemical combinations thereof.

Embodiment 13

The diesel oxidation catalyst composition of any preceding or subsequent embodiment, wherein the refractory metal oxide is a silica-doped alumina, silica-doped titania, or silica-doped zirconia.

Embodiment 14

The diesel oxidation catalyst composition of any preceding or subsequent embodiment, wherein the refractory metal oxide comprises 1-10% $SiO_2$-doped $Al_2O_3$, 1-20% $SiO_2$-doped $TiO_2$, or 1-30% $SiO_2$-doped $ZrO_2$.

Embodiment 15

The diesel oxidation catalyst composition of any preceding or subsequent embodiment, wherein the refractory metal oxide comprises 1% $SiO_2$-doped $Al_2O_3$ or 8-14% $SiO_2$-doped $TiO_2$.

Embodiment 16

A diesel oxidation catalyst article, comprising a substrate having a coating comprising the diesel oxidation catalyst composition of any preceding or subsequent embodiment disposed thereon.

Embodiment 17

The diesel oxidation catalyst article of any preceding or subsequent embodiment, wherein the refractory metal oxide material is present as a layer overlying the substrate and positioned between the substrate and the coating.

Embodiment 18

A method of treating an exhaust stream from a diesel engine, comprising passing the exhaust stream through the diesel oxidation catalyst article of any preceding or subsequent embodiment such that NO is oxidized within the catalyst article.

Embodiment 19

A catalyzed soot filter article, comprising a substrate having a coating comprising the diesel oxidation catalyst composition of any preceding or subsequent embodiment disposed thereon.

Embodiment 20

A method of making a catalyst article comprising platinum group metal nanoparticles, comprising applying a refractory metal oxide slurry and a colloidal dispersion comprising platinum group metal nanoparticles to a substrate.

Embodiment 21

The method of any preceding or subsequent embodiment, wherein the catalyst article is a diesel oxidation catalyst article or a catalyzed soot filter article.

Embodiment 22

The method of any preceding or subsequent embodiment, further comprising calcining the coated substrate after the applying step.

Embodiment 23

The method of any preceding or subsequent embodiment, further comprising forming a washcoat slurry comprising the refractory metal oxide slurry in water and the colloidal dispersion and applying the refractory metal oxide slurry and the colloidal dispersion to the substrate in the form of the washcoat.

Embodiment 24

The method of any preceding or subsequent embodiment, comprising: applying the refractory metal oxide slurry to the substrate; calcining the refractory metal oxide coating on the substrate; and thereafter applying the colloidal dispersion overlying the calcined refractory metal oxide coating.

Embodiment 25

The method of any preceding or subsequent embodiment, wherein the platinum group metal nanoparticles comprise platinum.

Embodiment 26

The method of any preceding or subsequent embodiment, wherein the refractory metal oxide is selected from the group consisting of alumina, silica, zirconia, titania, ceria, and physical mixtures or chemical combinations thereof.

Embodiment 27

The method of any preceding or subsequent embodiment, wherein the refractory metal oxide is a silica-doped alumina, silica-doped titania, or silica-doped zirconia.

Embodiment 28

The method of any preceding or subsequent embodiment, wherein the refractory metal oxide comprises 1-10% $SiO_2$-doped $Al_2O_3$, 1-20% $SiO_2$-doped $TiO_2$, or 1-30% $SiO_2$-doped $ZrO_2$.

Embodiment 29

The method of any preceding or subsequent embodiment, wherein the refractory metal oxide comprises 1% $SiO_2$-doped $Al_2O_3$ or 8-14% $SiO_2$-doped $TiO_2$.

Embodiment 30

The method of any preceding or subsequent embodiment, wherein at least about 90% of the nanoparticles have a particle size +/− about 1 nm of the average particle size.

Embodiment 31

The method of any preceding or subsequent embodiment, wherein at least about 95% of the nanoparticles have a particle size +/−2 nm of the average particle size.

Embodiment 32

The method of any preceding or subsequent embodiment, wherein at least about 95% of the nanoparticles have a particle size +/− about 1 nm of the average particle size.

Embodiment 33

The method of any preceding or subsequent embodiment, wherein the average particle size of the nanoparticles is about 2 to about 3 nm.

Embodiment 34

The method of any preceding or subsequent embodiment, wherein the average particle size of the nanoparticles is about 3 to about 5 nm.

Embodiment 35

The method of any preceding or subsequent embodiment, wherein the average particle size of the nanoparticles is about 5 to about 7 nm.

Embodiment 36

The method of any preceding or subsequent embodiment, wherein the average particle size of the nanoparticles is about 7 to about 9 nm.

Embodiment 37

The method of any preceding or subsequent embodiment, wherein the coating is substantially free of halides, alkali metals, alkaline earth metals, sulfur compounds, and boron compounds.

Embodiment 38

The method of any preceding or subsequent embodiment, further comprising aging the catalyst article by subjecting the article to heat treatment at 550-600° C. wherein at least about 50% of the PGM particles after aging have diameters of about 1 to 50 nm.

Embodiment 39

The method of any preceding or subsequent embodiment, further comprising aging the catalyst article by subjecting the article to heat treatment at 550-600° C. wherein at least about 75% of the PGM particles after aging have diameters of about 1 to 50 nm.

Embodiment 40

The method of any preceding or subsequent embodiment, further comprising aging the catalyst article by subjecting the article to heat treatment at 550-600° C. wherein at least about 50% of the PGM particles after aging have diameters of about 1 to 25 nm.

Embodiment 41

The method of any preceding or subsequent embodiment, further comprising: preparing the platinum group metal nanoparticles by a method comprising: a) preparing a solution of platinum group metal precursors selected from salts of Pt, Pd, Au, Ag, Ru, Rh, Ir, Os and alloys thereof in the presence of a dispersion medium and a water soluble polymer suspension stabilizing agent, wherein the platinum group metal precursors are substantially free of halides, alkali metals, alkaline earth metals, sulfur compounds, and boron compounds; and b) combining the solution with a reducing agent to provide a platinum group metal nanoparticle colloidal dispersion wherein the nanoparticle concentration is at least about 2 wt. % of the total weight of the colloidal dispersion and wherein at least about 90% of the platinum group metal in the colloidal dispersion is in fully reduced form.

Embodiment 42

An emission treatment system for treatment of an exhaust gas stream, the emission treatment system comprising: a diesel engine producing an exhaust gas stream; a first catalyst article according to claim 16 positioned in fluid communication with the exhaust gas stream and adapted for oxidation of carbon monoxide and hydrocarbon gases within the exhaust stream to form a treated exhaust gas stream; and at least one additional catalyst article downstream from the first catalyst article and in fluid communication with the treated exhaust gas stream, the at least one additional catalyst article adapted for ammonia oxidation, particulate filtration, $NO_x$ storage, $NO_x$ trapping, selective catalytic reduction of $NO_x$, or combinations thereof.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosure, in any of its aspects and example implementations, should be viewed as combinable unless the context of the disclosure clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

Figure 1B:
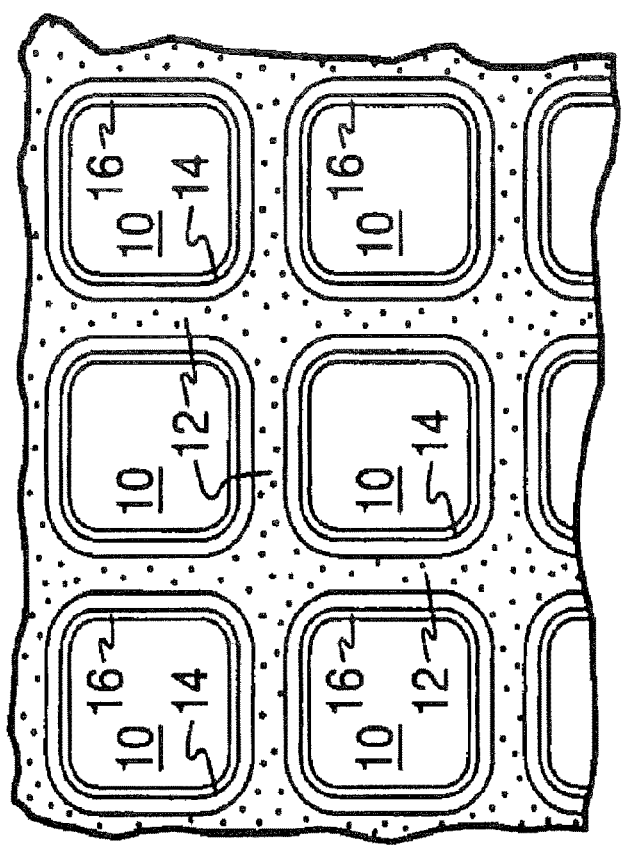
FIG. 1B is a partial cross-sectional view enlarged relative to FIG. 1A and taken along a plane parallel to the end faces of the carrier of FIG. 1A, which shows an enlarged view of a plurality of the gas flow passages shown in FIG. 1A.

The present invention now will be described more fully hereinafter. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents. It is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments"

or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The articles "a" and "an" are used herein to refer to one or to more than one (i.e., to at least one) of the grammatical object of the article. By way of example, "a reducing agent" means one reducing agent or more than one reducing agent. Any ranges cited herein are inclusive. The term "about" used throughout this specification are used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0. The term "substantially" similarly is used to describe and account for small fluctuations. Accordingly, where a composition is referred to as "substantially free" of a given component, unless otherwise specified, this can mean, e.g., that the composition comprises less than about 5%, such as less than about 2%, less than about 1%, less than about 0.5%, less than about 0.1%, or less than about 0.05% of that component by weight of the composition. All measurements herein are performed at ambient conditions, 25° C. and 1 atm of pressure, unless otherwise indicated.

Where ranges in the claims of this application do not find explicit support in the specification, it is intended that such claims provide their own disclosure as support for claims or teachings in a later amendment of this application. Numerical ranges of ingredients that are bounded by zero on the lower end (for example, 0-10 vol. % PVP) are intended to provide support for the concept "up to [the upper limit]," for example "up to 10 vol. % PVP," vice versa, as well as a positive recitation that the ingredient in question is present in an amount that does not exceed the upper limit. An example of the latter is "comprises PVP, provided the amount does not exceed 10 vol. %." A recitation such as "8-25 vol. % (PGM+stabilizing agent+reducing agent)" means that any or all of PGM, stabilizing agent, and/or reducing agent may be present in an amount of 8-25 vol. % of the composition.

The present invention generally provides a diesel oxidation catalyst (DOC) composition suitable for at least partial oxidation of NO to $NO_2$, which may optionally further comprise a CSF component to treat the soluble organic fraction of particulate matter present in diesel exhaust. The DOC compositions disclosed herein comprise PGM nanoparticles and a porous refractory oxide support, wherein such compositions provide enhanced NO oxidation as compared with comparable compositions comprising PGM complexes impregnated on a porous refractory oxide support. As used herein, "impregnated" or "impregnation" refers to permeation of catalytic material into the porous structure of the support material. The DOC compositions can be prepared and coated onto a catalyst substrate using a washcoat technique as generally known to one skilled in the art and as set forth more fully below.

Catalyst Composition

The DOC composition includes a PGM component in reduced nanoparticle form (e.g., wherein at least about 90% of the PGM is in reduced form) and generally further comprises one or more porous refractory oxide supports. As used herein, "platinum group metal" or "PGM" refers to platinum group metals or oxides thereof, including platinum (Pt), palladium (Pd), ruthenium (Ru), rhodium (Rh), osmium (Os), iridium (Ir), and mixtures thereof. In certain embodiments, the platinum group metal comprises a combination of platinum and palladium, such as in a weight ratio of about 1:10 to about 10:1, more typically in a platinum to palladium ratio equal to or greater than about 1.5:1, equal to or greater than about 2:1, or equal to or greater than about 5:1. The concentrations of PGM component (e.g., Pt, Pd or a combination thereof) can vary, but will typically be from about 0.1 wt. % to about 10 wt. % relative to the weight of the porous refractory oxide support material (e.g., about 1 wt. % to about 6 wt. % relative to the refractory oxide support) in a given composition.

"Refractory metal oxides" or "porous refractory oxides" refers to porous metal-containing oxide materials exhibiting chemical and physical stability at high temperatures, such as the temperatures associated with diesel engine exhaust. Exemplary refractory oxides include alumina, silica, zirconia, titania, ceria, and physical mixtures or chemical combinations thereof, including atomically-doped combinations and including high surface area or activated compounds such as activated alumina. Exemplary combinations of metal oxides include alumina-zirconia, alumina-ceria-zirconia, lanthana-alumina, lanthana-zirconia-alumina, baria-alumina, baria lanthana-alumina, baria lanthana-neodymia alumina, and alumina-ceria.

Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina, and low bulk density large pore boehmite and gamma-alumina.

High surface area refractory oxide supports, such as alumina support materials, also referred to as "gamma alumina" or "activated alumina," typically exhibit a BET surface area in excess of 60 $m^2$/g, often up to about 200 $m^2$/g or higher. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of 60 to 350 $m^2$/g, and typically 90 to 250 $m^2$/g.

In certain preferred embodiments, refractory oxide supports useful in the DOC compositions disclosed herein are doped alumina materials, such as Si-doped alumina materials (including, but not limited to, 1-10% $SiO_2$—$Al_2O_3$), doped titania materials, such as Si-doped titania materials (including, but not limited to, 1-10% or 1-20% $SiO_2$—$TiO_2$), or doped zirconia materials, such as Si-doped $ZrO_2$ (including, but not limited to, 1-30% or 5-30% $SiO_2$—$ZrO_2$).

Substrate

According to one or more embodiments, the substrate used for supporting the DOC composition may be constructed of any material typically used for preparing automotive catalysts and will typically comprise a metal or ceramic honeycomb structure. The substrate typically provides a plurality of wall surfaces upon which the DOC washcoat composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-a alumina, silicon nitride, silicon carbide, zircon mullite, spodumene, alumina-silica magnesia, aluminum titanate, zircon silicate, sillimanite, magnesium silicates, zircon, petalite, a alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the catalyst composition associated therewith (e.g., a CSF composition) can permeate into the pore structure of the porous walls (i.e., partially occluding the pore openings) in addition to being disposed on the surface of the walls.

Figure 1A:
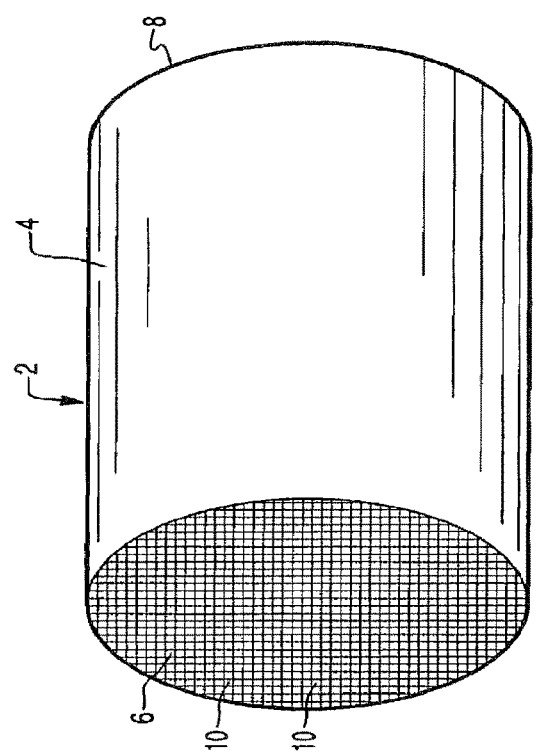
FIG. 1A is a perspective view of a honeycomb-type substrate which may comprise a diesel oxidation catalyst (DOC) washcoat composition in accordance with the present invention.

FIGS. 1A and 1B illustrate an exemplary substrate 2 in the form of a flow-through substrate coated with a washcoat composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. In one particular embodiment, a first layer (e.g., layer 14) comprises a refractory oxide support material and a second layer (e.g., layer 16) comprises the PGM nanoparticles disclosed herein. The present invention can be practiced with one or more (e.g., 2, 3, or 4) washcoat layers and is not limited to the two-layer embodiment illustrated in FIG. 1B.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$"), are used herein to mean the weight of a component per volume of the substrate, including the volume of void spaces of the substrate. Other units of weight per volume such as g/L are also sometimes used. The total loading of the DOC composition (including PGM nanoparticles and support material) on the catalyst substrate, such as a monolithic flow-through substrate, is typically from about 0.5 to about 6 g/in$^3$, and more typically from about 1 to about 5 g/in$^3$. Total loading of the PGM component without support material (e.g., the Pt nanoparticles) is typically in the range of about 5 to about 200 g/ft$^3$ (e.g., about 5 to about 50 g/ft$^3$ and, in certain embodiments, about 10 to about 50 g/ft$^3$ or about 10 to about 100 g/ft$^3$). It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Method of Making DOC Composition

According to the present disclosure, a DOC catalyst composition is generally prepared by associating a colloidal dispersion of PGM nanoparticles (PGMNPs) with a refractory oxide support material. Such colloidal dispersions can, in some embodiments, comprise: a) a plurality of one or more platinum group metal nanoparticles (PGMNPs), b) a dispersion medium, c) a stabilizing agent, and d) reducing agent, which will be disclosed herein below in greater detail.

Advantageously, the PGM in colloidal dispersions useful according to the disclosure is substantially in fully reduced form, meaning that at least about 90% of the platinum group metal content (i.e., the bulk of the nanoparticle) is reduced to the metallic form (PGM(0)). In some embodiments, the amount of PGM in fully reduced form is even higher, e.g., at least about 92%, at least about 94%, at least about 95%, at least about 96%, at least about 97%, at least about 98%, or at least about 99% of the PGM is in fully reduced form. The amount of PGM(0) can be determined using ultrafiltration, followed by Inductively Coupled Plasma/Optical Emission Spectrometry (ICP-OES). In this method, the unreduced PGM species in the colloidal dispersion can be separated from the PGM(0) nanoparticles, and then the PGMNPs can be quantified by ICP-OES.

The PGMNP concentration within the colloidal dispersions disclosed herein can be higher than that within known colloidal dispersions. In some embodiments, the PGMNP concentration is about 2 wt. % or more of the colloidal dispersion. For example, the PGMNP concentration can be from about 2 wt. % to about 80 wt. % of the colloidal dispersion, about 2 wt. % to about 20 wt. % of the colloidal dispersion, about 2 wt. % to about 10 wt. % of the colloidal dispersion, or 2 wt. % to about 5 wt. % of the colloidal dispersion. PGMNP concentrations can be measured using ICP-OES.

The average size of the as-prepared PGMNPs in the colloidal dispersion can vary. In some embodiments, the PGMNPs in a given colloidal dispersion can have average particle sizes of about 1 nm to about 10 nm, e.g., about 1 nm to about 6 nm, such as an average particle size of about 1 nm, about 2 nm, about 3 nm, about 4 nm, or about 5 nm. Certain embodiments can have average particle sizes of about 1-2 nm, about 1-3 nm, about 1-4 nm, about 1-5 nm, about 1-6 nm, about 2-3 nm, about 2-4 nm, about 2-5 nm, about 2-6 nm, about 3-4, about 3-5 nm, about 3-6 nm, about 4-5 nm, about 4-6 nm, or about 5-6 nm.

Advantageously, the PGMNPs in the colloidal dispersions disclosed herein are substantially monodisperse. In certain embodiments, the particles can be viewed as monodisperse, meaning the PGMNP population is highly uniform in particle size. Certain monodisperse particle populations useful in the present invention can be characterized as consisting of particles wherein at least 95% of the particles have a particle size within 50 percent of the average particle size for the particle population, or within 20 percent, or within 15 percent, or within 10 percent (i.e., wherein at least 95% of all particles in the population have a particle size within the given percentage range around the average particle size). In other embodiments, at least 96%, 97%, 98%, or 99% of all particles fall within these ranges. In one exemplary embodiment, the average particle size is about 2 nm and at least 95% of all particles (or at least 96%, 97%, 98%, 99%, or 100% of all particles) in the population have a particle size in the range of about 1 nm to about 3 nm (i.e., within about 50 percent of the average particle size). Specific PGMNP dispersions can comprise substantially monodisperse dispersions, with average PGMNP particle sizes of about 2 nm, about 3 nm, about 4 nm, and about 5 nm.

Particle sizes and size distribution of PGMNPs can be determined using Transmission Electron Microscopy (TEM). Such values can be found by visually examining a TEM image, measuring the diameter of the particles in the image, and calculating the average particle size of the measured particles based on magnification of the TEM image. The particle size of a particle refers to the smallest diameter sphere that will completely enclose the particle, and this measurement relates to an individual particle as opposed to an agglomeration of two or more particles. The above-noted size ranges are average values for particles having a distribution of sizes.

The dispersion medium may be, but is not limited to, at least one polar solvent selected from the group consisting of water, alcohols (including polyols), dimethyl formamide (DMF), and combinations thereof. The alcohol may, in some embodiments, be selected from the group consisting of methanol, ethanol, 1-propanol, 2-propanol, 1-butanol, 2-butanol, iso-butanol, hexanol, octanol, and combinations thereof. The polyol may, in some embodiments, be selected from the group consisting of glycerol, glycol, ethylene glycol, diethylene glycol, triethylene glycol, butanediol, tetraethylene glycol, propylene glycol, polyethylene glycol, polypropylene glycol, 1,2-pentadiol, 1,2-hexadiol, and combinations thereof. In one embodiment, the dispersion medium comprises water; accordingly, certain dispersions as disclosed herein can be described as aqueous colloidal dispersions.

The stabilizing agent is typically a polymer suspension stabilizing agent that is soluble in the dispersion medium, used to improve dispersion of the PGM nanoparticles (e.g., where the dispersion medium comprises water, the stabilizing agent is typically a water-soluble polymer suspension stabilizing agent). The composition and the size (e.g., weight average-molecular weight, $M_w$) of the polymer can vary. In some embodiments, the polymer has a $M_w$ of 2,000 to 2,000,000 Da, and preferably has a $M_w$ of 10,000 to 60,000 Da (measured using Gel Permeation Chromatography (GPC)). Suitable polymers include, but are not limited to, polyvinyl pyrrolidone (PVP), a copolymer including vinyl pyrrolidone as a first polymerization unit, and a fatty acid-substituted or unsubstituted polyoxyethylene. Polyvinyl pyrrolidone is particularly useful as the polymer suspension stabilizing agent.

Where a copolymer including vinyl pyrrolidone as a first polymerization unit is used as a stabilizing agent, the copolymer may further include, e.g., an acrylic acid, styrene, vinyl acetate, or vinyl alcohol as a second polymerization unit. Such copolymers can comprise first and second polymerization units in a weight ratio of 1:99 to 99:1, and preferably, 20:80 to 80:20. Certain exemplary copolymers include (1-vinyl pyrrolidone)-acrylic acid copolymer and (1-vinyl pyrrolidone)-vinyl acetic acid copolymer. In certain embodiments, where a (1-vinyl pyrrolidone)-acrylic acid copolymer is used, the 1-vinyl pyrrolidone repeating unit and the acrylic acid repeating unit are in a weight ratio of about 99:1 to about 50:50 or about 60:40 to about 80:20 (e.g., 75:25). In certain embodiments, where a (1-vinyl pyrrolidone)-vinyl acetic acid copolymer is used, the 1-vinyl pyrrolidone repeating unit and the vinyl acetic acid repeating unit are in a weight ratio of about 99:1 to 50:50 or about 50:50 to about 70:30 (e.g., 57:43). Where a fatty acid-substituted polyoxyethylene is used as the stabilizing agent, the fatty acid can be selected from palmitic acid, oleic acid, linoleic acid, or stearic acid, with stearic acid being more preferred.

The polymer suspension stabilizing agent is generally present in an amount of about 0.1 to 20, preferably about 5 to 10, parts by weight based on 100 parts of the dispersion medium by weight. If the water-soluble polymer suspension stabilizing agent is used in an amount of less than 0.1 parts by weight, it is difficult to provide the effect of the stabilizing agent.

The reducing agent can be any reagent effective to reduce PGMs to metallic (PGM(0)) form and is advantageously soluble in the dispersion medium (e.g., water-soluble). Although not limited thereto, in certain embodiments, the reducing agent may be an organic reducing agent. Suitable reducing agents are, for example, hydrogen, hydrazine, urea, formaldehyde, formic acid, ascorbic acid, citric acid, glucose, sucrose, xylitol, meso-erythritol, sorbitol, glycerol, maltitol or oxalic acid. Further, liquid reducing agents such as monovalent alcohols from the group of methanol, ethanol, 1-propanol, iso-propanol, 1-butanol, 2-butanol, 2-methyl-propan-1-ol, allyl alcohol and diacetone alcohol, may be employed. Certain preferred reducing agents are primary and secondary alcohols selected from the group consisting of methanol, ethanol, 1-propanol, iso-propanol and 1-butanol and mixtures and combinations thereof. Further suitable liquid reducing agents are divalent alcohols such as ethylene glycol, propylene glycol, diethylene glycol, tetraethylene glycol or dipropylene glycol. Other preferred reducing agents are hydrazine-based reducing agents such as formic hydrazide and hydroxyethylhydrazine. Other reducing agents are natural plant-based polyphenol acids such as tannic acid and garlic acid. In one embodiment, the reducing agent is ascorbic acid. The reducing agent is usually present in an amount of about 1-10% by weight in the dispersion.

In certain embodiments, the colloidal PGMNP dispersions disclosed herein are substantially free from halides, alkali metals, alkaline earth metals, and sulfur compounds. For example, the dispersions may comprise less than about 10 ppm of each such component (i.e., less than about 10 ppm halides, alkali metals, alkaline earth metals, and/or sulfur compounds) based on the total weight of the colloidal dispersion. Particularly, it is desirable for the halide (e.g., chloride, bromide, and iodide) content to be less than about 10 ppm and for the sodium content to be less than about 10 ppm based on the total weight of the colloidal dispersion. Even lower concentrations of such components are even more desirable, e.g., less than about 5 ppm, less than about 2 ppm, or less than about 1 ppm based on the total weight of the colloidal dispersion. In preferred embodiments, no component(s) used in the production of the colloidal dispersions disclosed herein contain halides, alkali metals, alkaline earth metals, and/or sulfur compounds (i.e., none of these components are intentionally added during preparation of the colloidal dispersions) and preferably no reagent(s) used in the production of the colloidal dispersions disclosed herein comprise significant amounts of such components (which may be present, if at all, as impurities in the reagents used, only in very small quantities, as referenced above, e.g., leading to a colloidal dispersion with less than about 10 ppm of that impurity based on the total weight of the colloidal dispersion). Minimal halide content is advantageous, as it has been shown to poison catalyst compositions.

Furthermore, in certain embodiments, the colloidal PGMNP dispersions disclosed herein are substantially free from sodium and boron (as these can also function to poison the catalyst). Sodium borohydride is a common reducing reagent for platinum-containing materials and advantageously, the PGMNP dispersions disclosed herein can be provided in substantially fully reduced form without using such reagents (i.e., sodium borohydride and other similar reducing reagents). Advantageously, the PGMNPs can be reduced under mild conditions and do not require the use of such reagents. Again, by "substantially free" is meant that the dispersions may, in some embodiments, comprise less than about 10 ppm of sodium and/or less than about 10 ppm of boron based on the total weight of the colloidal dispersion.

The colloidal PGMNPs dispersions disclosed herein are preferably stable. By "stable" as used herein is meant that the colloidal dispersion remains well dispersed for some period of time. In certain embodiments, such dispersions can be considered to be shelf-stable for a period of about 3 months or more, about 6 months or more, about 9 months or more, or about 12 months or more. The shelf stability can be simulated, for example, by centrifuging a sample (e.g., in a Beckman Coulter Allegra™ X-22 Centrifuge) and observing the resulting dispersion to evaluate whether any precipitation is evident. For example, it is generally considered that, if a sample remains well-dispersed with no any precipitation after 4000 rpm for 10 min, the sample has a shelf life stability (e.g., at room temperature) of at least six months. This high stability allows, e.g., for the colloidal dispersion to be stored or transported away from the site of manufacture to a different site for application if necessary without any negative impact on the material. The colloidal PGM precursors provided according to the present disclosure in some embodiments comprise only a stabilizing agent and organic reductants and, as such, in preferred embodiments, no further treatment of the precursors is required prior to catalyst article preparation.

One exemplary colloidal dispersion that may be useful in particular embodiments disclosed herein comprises: a) a plurality of nanoparticles (e.g., selected from the group consisting of Pt, Pd, alloys thereof, and mixtures thereof), wherein about 90% or more of the Pt and/or Pd is in fully reduced form, wherein the Pt and/or Pd concentration is from about 2 wt. % to about 5 wt. % of the colloidal dispersion, and wherein the nanoparticles have average particle sizes of from about 1 nm up to about 3 nm; b) a stabilizing agent (e.g., polyvinylpyrrolidone); and c) a reducing agent (e.g., ascorbic acid), wherein the colloidal dispersion is substantially free of halides, alkali metals, alkaline earth metals, sulfur compounds, and boron compounds; and wherein, when centrifuged at 4,000 rpm for 10 minutes, the platinum metal nanoparticles are not separated from the colloidal dispersion.

Although in some embodiments, the nanoparticles are provided in the form of a dispersion as disclosed above, in certain embodiments, the nanoparticle population can be further concentrated to remove water, forming a more concentrated dispersion and, in some embodiments providing isolated metal nanoparticles, separated by the stabilizing agent. Various methods are known for concentrating dispersions and/or for obtaining solid metal nanoparticles (e.g., by removal of the solvent from the dispersion and/or by adding a second solvent to the dispersion).

Although the present disclosure provides, herein below, one method for the preparation of PGMNP dispersions that may be useful in preparing the catalysts provided herein, the disclosure is not intended to be limited thereto and, in some embodiments, alternative means for producing PGMNPs can be employed and catalyst compositions and articles prepared therefrom. Accordingly, certain PGMNP dispersions that may be used according to the present disclosure can be prepared, e.g., by: a) preparing a solution comprising: PGMNP precursors, at least one water soluble polymer suspension stabilizing agent; and a solvent; and b) combining the solution with at least one reducing agent so as to convert at least about 90% of the PGM to fully reduced metal. Platinum metal precursors useful in such preparations include salts of any of the platinum group metals noted herein (i.e., salts of Pt, Pd, Au, Ag, Ru, Rh, Ir, Os and alloys thereof), which are substantially free of halides, alkali metals, alkaline earth metals, sulfur compounds, and boron compounds. Such salts include, for example, hydroxyl salts, nitrates, carboxylic acid salts, ammonium salts, and oxides. Particular examples of platinum metal precursors include Pt(NH$_3$)$_4$(OH)$_2$, Pd(NH$_3$)$_4$(OH)$_2$, Pd(OH)$_2$, Ir(OH)$_4$, Rh nitrate, Pt nitrate, Pt citrate, Pd(II) nitrate, and Pd(II) citrate.

The preparation of PGMNP dispersions can be conducted under varying conditions. For example, in some embodiments, the method (including the preparing and/or combining steps noted above) can be conducted at room/ambient temperature (e.g., 15-25° C.). In some embodiments, one or more steps of the method can be conducted at elevated temperature. For example, the combining step may include a heating step such that the combined solution is heated at an elevated temperature, e.g., to promote the reduction of the PGM. In other embodiments, the colloidal dispersion comprising fully reduced nanoparticles is prepared and subsequently heated. In various embodiments, such elevated temperatures (to promote reduction and/or to heat post-reduction) can be greater than ambient temperature, such as ambient temperature to about 200° C., ambient temperature to about 125° C., or ambient temperature to about 100° C. (e.g., about 25° C. to about 100° C., 125° C., or 200° C.) In some embodiments, such temperatures can be about 55° C. to about 125° C., or about 55° C. to about 200° C. In certain embodiments, temperatures above 100° C. may be beneficial, e.g., at least about 100° C., e.g., about 100° C. to about 200° C. Certain suitable temperatures useful in various embodiments are about 90° C. to 130° C. (e.g., about 100° C., about 120° C., or about 125° C.).

The time for which the solution is reacted (and, optionally, heated) during the combining step can vary and can be any period of time sufficient to convert a substantial portion (e.g., at least about 90%) of the PGM to fully reduced metal (PGM (0)). For example, in some embodiments, the PGM is fully reduced over a period of at least about 30 minutes, at least about 1 hour, at least about 2 hours, at least about 6 hours, or at least about 12 hours. In certain embodiments, the solution is reacted over a period of about 30 minutes to about 24 hours, e.g., about 1 hour to about 18 hours. It is noted that reactivity of the reagents (including the platinum metal precursor and the reducing agent) can affect the rate of reaction. It is also noted that time and temperature may be indirectly related for a given reaction, i.e., conducting the reaction at elevated temperature may lessen the amount of time required to obtain the desired reduction. Accordingly, it is to be understood that, for a given reaction, increasing the temperature may decrease the amount of time required for the disclosed methods and decreasing the temperature may increase the amount of time required for the disclosed methods.

In certain embodiments, the disclosed methods for the preparation of PGMNP dispersions can further comprise a hydrothermal processing step. For example, in certain embodiments, the reaction mixture (wherein the PGM can be in varying oxidation states, e.g., in precursor form, substantially in reduced form, or at any stage between) can be subjected to heating (including hydrothermal processing) in an autoclave. In one particular embodiment, such a mixture can be heated at an elevated temperature above ambient temperature, such as at least about 100° C., e.g., about 100° C. to about 200° C., including at about 125° C., for a particular period of time, such as at least about 1 hour, at least about 2 hours, at least about 3 hours, e.g., about 1 to about 10 hours, including for about 5 hours, in an autoclave.

The resulting colloidal PGMNP dispersions can, in some embodiments, be characterized as comprising platinum group metal nanoparticles in relatively high yield. For example, in various embodiments, the methods can lead to dispersions comprising platinum group metal nanoparticles wherein 90% or more of the platinum group metal is in fully reduced form and where the overall percent yield of nanoparticles is at least about 60%, at least about 70%, at least about 80%, at least about 90%, or at least about 98%. In some embodiments, the methods provide the desired product in quantitative or near quantitative yield.

As prepared, the colloidal dispersions can have varying concentrations of nanoparticles, e.g., about 1% to about 10% by weight, e.g., about 2% to about 6% by weight, about 2% to about 5% by weight, or about 4% to about 6% by weight, with no further processing (e.g., concentrating steps). The colloidal dispersions can be used as is or can be diluted with suitable solvents to lower PGM concentrations (e.g., to a concentration of about 0.05 wt. % to about 2 wt. %, such as about 0.05 wt. %, 0.5 wt. %, 1.5 wt. %, etc.). In other embodiments, the colloidal dispersions can be concentrated (e.g., by removing solvent therefrom). Methods for concentrating dispersions generally are known and, in some embodiments, concentrations significantly higher than those originally obtained (e.g., above about 2%, above about 3%, above about 4%, above about 5% or above about 6% by weight) can be obtained in this manner. For example, concentrating can provide a dispersion having a concentration of about 5% to about 80% by weight, e.g., about 5% to about 50% by weight. Accordingly, various ranges of concentrations can be achieved, e.g., about 0.05 wt. % to about 50 wt. %, about 0.05 wt. % to about 25 wt. %, or about 0.05 to about 15 wt. %, including about 2 wt. % to about 80 wt. %, about 2 wt. % to about 25 wt. %, and about 2 wt. % to about 10 wt. %.

In certain embodiments, the colloidal dispersions can be treated so as to obtain isolated PGMNPs therefrom. To obtain isolated nanoparticles, the methods disclosed herein above can, in some embodiments, further comprises heating the dispersion or otherwise processing the dispersion to ensure removal of at least a substantial portion of the solvent therefrom.

Preparation of a DOC composition according to the present disclosure typically comprises associating a PGMNP colloidal dispersion, such as disclosed hereinabove, with a refractory oxide support material. This association can be achieved in various ways. In some embodiments, these materials are combined and then applied to a substrate to form a DOC composition and, in other embodiments, these materials are separately applied to a substrate to form a DOC composition.

In embodiments wherein a DOC composition is independently prepared (prior to coating a substrate), the components can be combined in varying manners. For example, in certain such embodiments, a refractory metal oxide slurry suspension is prepared (e.g., in water), optionally milled to the desired particle size, and a PGMNP colloidal dispersion is combined with the slurry suspension to form a DOC composition. Alternatively, a refractory metal oxide material can be directly added to a PGMNP colloidal dispersion and the resulting mixture can be optionally milled to the desired particle size to form a DOC composition.

It is noted that, when traditional PGM precursors are used for the preparation of catalyst compositions, the initial PGM particle size is generally impacted by the amount of refractory metal oxide material associated therewith. At a certain PGM loading, higher refractory metal oxide material amounts generally lead to smaller average PGM particle size. Conversely, lower refractory metal oxide material amounts generally lead to larger average PGM particle size and can lead to bimodal PGM particle size distribution. Although not intending to be limited by theory, it is believed that the PGM tends to disperse more finely on greater amounts of support material. Using such traditional PGM precursors, varying the PGM to refractory metal oxide material ratio can also impact the initial PGM oxidation state (and, accordingly, the activity of the PGM). By contrast, when a colloidal PGM precursor as described herein is used, the initial PGM particle size and PGM oxidation state are independent of metal oxide material loading. The PGM particle in such materials is generally pre-formed and pre-reduced prior to being combined with the refractory metal oxide according to the methods disclosed herein and, accordingly, can readily be combined with varying amounts of refractory metal oxide with little to no effect on the PGM particle size or PGM activity.

Substrate Coating Process

As referenced above, the DOC composition can, in some embodiments, be independently prepared and coated on a substrate. The DOC composition can be mixed with water (if in dried form) to form a slurry for purposes of coating a catalyst substrate. In addition to the catalyst particles, the slurry may optionally contain a binder, hydrocarbon (HC) storage components (e.g., zeolite), associative thickeners, and/or surfactants (including anionic, cationic, non-ionic or amphoteric surfactants). In some embodiments, the pH of the slurry can be adjusted, e.g., to an acidic pH of about 3 to about 5.

Optionally, as noted above, the slurry may contain one or more hydrocarbon (HC) storage components for the adsorption of hydrocarbons (HC). Any known hydrocarbon storage material can be used, e.g., a micro-porous material such as a zeolite or zeolite-like material. When present, zeolite or other HC storage components are typically used in an amount of about 0.05 g/in$^3$ to about 1 g/in$^3$. When present, a binder is typically used in an amount of about 0.02 g/in$^3$ to about 0.5 g/in$^3$. The alumina binder can be an alumina material, for example, boehmite, gamma-alumina, or delta/theta alumina or a non-alumina material such as a zirconia or silica sol.

The slurry can be milled to enhance mixing of the particles and formation of a homogenous slurry. The milling can be accomplished in a ball mill, continuous mill, or other similar equipment, and the solids content of the slurry may be, e.g., about 20-60 wt. %, more particularly about 30-40 wt. %. In one embodiment, the post-milling slurry is characterized by a D90 particle size of about 10 to about 50 microns (e.g., about 10 to about 20 microns). The D90 is defined as the particle size at which about 90% of the particles have a finer particle size.

The slurry is then coated on the catalyst substrate using a washcoat technique known in the art. As used herein, the term "washcoat" has its usual meaning in the art of a thin, adherent coating of a material applied to a substrate, such as a honeycomb flow-through monolith substrate or a filter substrate which is sufficiently porous to permit the passage therethrough of the gas stream being treated. As used herein and as described in Heck, Ronald and Robert Farrauto, "Catalytic Air Pollution Control," New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can have unique chemical catalytic functions.

In one embodiment, the substrate is dipped one or more times in the slurry or otherwise coated with the slurry. Thereafter, the coated substrate is dried at an elevated temperature (e.g., 100-150° C.) for a period of time (e.g., 1-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry or PGMNP dispersion rheology. In addition, the coating/drying/calcining process can be repeated as needed to build the coating to the desired loading level or thickness.

In other embodiments, the components of the DOC composition are separately coated on a substrate (and, in such embodiments, the "DOC composition" thus is not prepared until the substrate is coated with the two components, namely, the PGMNP colloidal dispersion and the refractory metal oxide support). For example, in some embodiments, a post-dip method is employed, wherein a substrate is first coated with a refractory oxide material by adding water to the refractory oxide material in particulate form and applying the resulting slurry to the substrate as a washcoat. The discussion above with regard to DOC composition slurries is relevant in the context of the refractory oxide material slurry in this embodiment. Accordingly, the types of additional components, the milling and the methods of applying the refractory oxide material slurry are the same as referenced above with regard to the DOC composition slurry.

After coating the refractory metal oxide slurry onto the substrate, the coated substrate can, in some embodiments, be dried and calcined. After calcination, a PGMNP colloidal dispersion can be coated onto the calcined refractory metal oxide layer. Although the PGMNP colloidal dispersion is generally directly used (i.e., in the form provided herein above, e.g., comprising: a) a plurality of PGM nanoparticles, wherein about 90% or more of the PGM (e.g., Pt and/or Pd) is in fully reduced form, wherein the PGM concentration is from about 2 wt. % to about 5 wt. % of the colloidal dispersion, and wherein the nanoparticles have average particle sizes of from about 1 nm up to about 3 nm; b) a stabilizing agent (e.g., polyvinylpyrrolidone); and c) a reducing agent (e.g., ascorbic acid), wherein the colloidal dispersion is substantially free of halides, alkali metals, alkaline earth metals, sulfur compounds, and boron compounds), in some embodiments, other components as generally described herein may be added thereto prior to coating the dispersion onto the coated support.

The PGMNP dispersion can be coated onto the coated support in a manner analogous to that described above for the slurry comprising refractory metal oxide and PGMNPs. For example, the PGMNP dispersion can be coated on the catalyst substrate using a washcoat technique, e.g., by dipping the coated substrate one or more times in the dispersion or otherwise coating the substrate with the dispersion. As disclosed above, the coated substrate (comprising refractory metal oxide and PGMNPs) is dried at an elevated temperature (e.g., 100-150° C.) for a period of time (e.g., 1-3 hours) and then calcined by heating (e.g., at 400-600° C.), typically for about 10 minutes to about 3 hours. Following drying and calcining, the final washcoat coating layer can be viewed as essentially solvent-free.

Advantageously, at least a portion of the PGMNPs associated with the substrate remain in the same form after calcining (e.g., having substantially the same average particle sizes). It is noted that such particle sizes may, in some embodiments, be significantly affected by aging. Where a catalyst article comprising the DOC composition disclosed herein is aged (e.g., for 50 hours at 550° C.), particles (nanoparticles) may still be observed; however, significantly fewer discrete particles may be noted than for the unaged sample (due, e.g., to agglomeration of particles) and, in some embodiments, particles with greater particle sizes (e.g., average particle sizes of about 5 to about 20 nm) are observed.

In particular, the presently disclosed PGM nanoparticle-containing catalytic compositions sinter to a lesser degree under mild aging conditions (e.g., in 10% steam in air, 1 L/min gas flow, at 550° C. for 50 h or at 600° C. for 20 hrs) than other, comparable materials that are not provided in nanoparticle form. Accordingly, in certain embodiments, aged materials prepared from PGM nanoparticle-containing catalytic compositions can still comprise at least about 25% particles having diameters of about 1 to 10 nm or at least about 50% particles having diameters of about 1 to 10 nm. Advantageously, in certain embodiments at least about 50% of the PGM particles have diameters of about 1 to 20 nm after mild aging, e.g., at least about 75% of the PGM particles have diameters of about 1 to 20 nm after mild aging. In some embodiments, at least about 50% of the PGM particles have diameters of about 1 to 50 nm after mild aging, e.g., at least about 75% of the PGM particles have diameters of about 1 to 50 nm after mild aging. In certain embodiments, less than about 50% of the PGM particles have diameters greater than about 50 nm, less than about 25% of the PGM particles have diameters greater than about 50 nm, or less than about 10% of the PGM particles have diameters greater than about 50 nm after mild aging. The PGMNP catalyst-coated substrates disclosed herein can comprise varying numbers of layers. In embodiments wherein the PGMNP is combined with the refractory metal oxide prior to application onto the substrate, the catalyst-coated substrates can comprise, e.g., 1, 2, 3, or 4 or more layers. In embodiments wherein the PGMNP and refractory metal oxide are present in separate layers, the PGMNP catalyst-coated substrates must comprise at least 2 layers and, where more than 2 layers are provided, the layers can alternate between PGMNP-containing and refractory metal oxide-containing layers. In some embodiments, one or more layer with different compositions are included along with the one or more layers (e.g., the layers comprising PGMNPs) disclosed herein.

As noted above, a catalyst article comprising the DOC composition of the invention exhibits enhanced NO conversion activity. Accordingly, one or more embodiments of the invention provide a catalyst article comprising a calcined DOC composition as disclosed herein (where the refractory metal oxide and PGMNPs are mixed or are layered), characterized by a NO to $NO_2$ conversion of at least about 2%, at least about 3%, or at least about 5% more than that exhibited by a comparable catalyst article comprising a calcined DOC composition prepared using a conventional platinum group metal solution comprising the same platinum group metal (e.g., $Pt(NH_3)_4(OH)_2$). In some embodiments, catalyst articles comprising the disclosed nanoparticle-containing DOC compositions can exhibit particularly good NO oxidation within certain temperature ranges, e.g., NO to $NO_2$ conversions of at least about 5% or at least about 10% more than that exhibited by a comparable catalyst article comprising a calcined DOC composition prepared using a conventional platinum group metal solution comprising the same platinum group metal (e.g., $Pt(NH_3)_4(OH)_2$) within the temperature range of about 200 to 250° C. Exemplary diesel oxidation catalyst articles in accordance with the present disclosure are set forth herein as Examples 7B, 8B, 9B, and 10B and comparative diesel oxidation catalysts are set forth herein as Examples 7A, 8A, 9A, and 10A, respectively.

Emission Treatment System

The present invention also provides an emission treatment system that incorporates the DOC composition or article described herein. The DOC composition of the present invention is typically used in an integrated emissions treatment system comprising one or more additional components for the treatment of diesel exhaust gas emissions. As such, the terms "exhaust stream", "engine exhaust stream", "exhaust gas stream" and the like refer to the engine effluent as well as to the effluent downstream of one or more other catalyst system components as described herein.

For example, the emission treatment system may further comprise a catalyzed soot filter (CSF) component and/or a selective catalytic reduction (SCR) catalytic article. Such optional additional components are typically located downstream from the diesel oxidation catalyst of the invention, although the relative placement of the various components of the emission treatment system can be varied. "Downstream" refers to a position of a component in an exhaust gas stream in a path further away from the engine than the preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relative to another component. The treatment system can include further components, such as ammonia oxidation materials, additional particulate filtration components, $NO_x$ storage and/or trapping components, and reductant injectors. The preceding list of components is merely illustrative and should not be taken as limiting the scope of the invention.

The CSF may comprise a substrate coated with a washcoat layer containing one or more catalysts for burning trapped soot and or oxidizing exhaust gas stream emissions. In general, the soot burning catalyst can be any known catalyst for combustion of soot. In the case of passive soot regeneration, the soot burning catalyst can be an oxidation catalyst comprising one or more platinum metal catalysts (e.g., platinum, palladium, and/or rhodium) to promote NO to $NO_2$ oxidation. In another embodiment, the CSF comprises a refractory metal oxide and a PGMNP combined by any of the methods described for preparation of a DOC of this invention, and can be applied to the filter substrate using any coating method known in the art.

Figure 2:
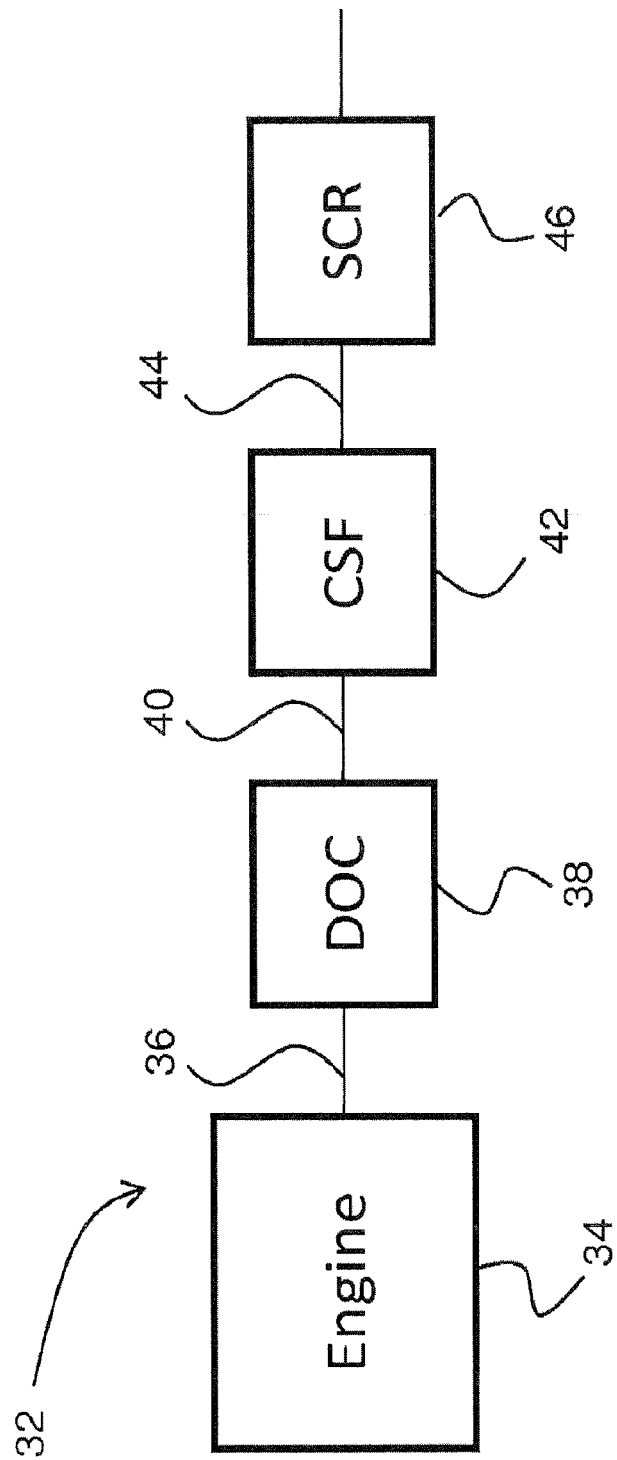
FIG. 2 shows a schematic depiction of an embodiment of an emission treatment system in which a DOC of the present invention is utilized.

One exemplary emissions treatment system is illustrated in FIG. 2, which depicts a schematic representation of an emission treatment system 32. As shown, an exhaust gas stream containing gaseous pollutants and particulate matter is conveyed via exhaust pipe 36 from an engine 34 to a diesel oxidation catalyst (DOC) 38, which is coated with the washcoat composition of the present invention. In the DOC 38, unburned gaseous and non-volatile hydrocarbons (i.e., the SOF) and carbon monoxide are largely combusted to form carbon dioxide and water. In addition, a proportion of the NO of the $NO_x$ component may be oxidized to $NO_2$ in the DOC. The exhaust stream is next conveyed via exhaust pipe 40 to a catalyzed soot filter (CSF) 42, which traps particulate matter present within the exhaust gas stream. The CSF 42 is optionally catalyzed for passive or active soot regeneration with a PGMNP-containing washcoat of the present invention. After removal of particulate matter, via CSF 42, the exhaust gas stream is conveyed via exhaust pipe 44 to a downstream selective catalytic reduction (SCR) component 16 for the further treatment and/or conversion of $NO_x$. Finally the exhaust can be conveyed to a selective ammonia oxidation catalyst (which is optionally catalyzed with a PGMNP-containing washcoat composition of the present invention) for removal of excess ammonia. This selective ammonia oxidation catalyst may be incorporated at the rear of the SCR monolith, or alternatively on a separate monolith.

EXPERIMENTAL

Aspects of the present invention are more fully illustrated by the following examples, which are set forth to illustrate certain aspects of the present invention and are not to be construed as limiting thereof.
Synthesis of Chloride- and Sodium-Free Colloidal PGM Nanoparticles with 2-5 wt. % PGM Content
Each of the following dispersions was prepared as described below and analyzed by TEM. For analysis, TEM samples were prepared by first diluting the colloidal Pt with DI water to a light brown solution. A droplet of this solution was applied to a holey-carbon coated Cu grid and dried at 60° C. A JEOL 200 kV TEM equipped with a LaB6 filament was used to collect digital images with a 2K×2K CCD camera.

Example 1

Figure 3:
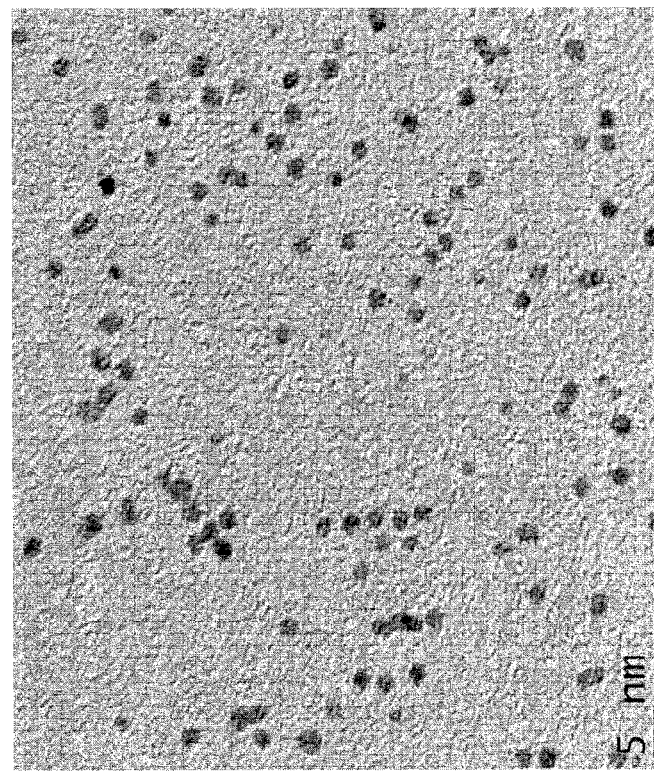
FIG. 3 is a transmission electron microscopy (TEM) image of Pt nanoparticles prepared using PVP as stabilizer and ascorbic acid as the reducing agent.

Synthesis of Chloride- and Sodium-Free Colloidal Pt Nanoparticles Using Polyvinylpyrrolidone (PVP) as the Stabilizer and Ascorbic Acid as the Reducing Agent In a method for synthesizing 100 g of 2% Pt colloidal solution, 40 g of PVP solution (0.02 M) and 15.86 g of solution comprising an ammine-containing coordination complex of Pt (12.61 wt. % Pt) and 13.39 g of $H_2O$ are mixed for about 30 min, then 30.75 g of ascorbic acid solution (1 M) is added to the mixture with stirring and mixed for about 25 min. The resulting mixture is transferred into a Teflon-lined autoclave and heated without stirring in a gravity convection oven at 100° C. for 12 h. After this time, the reactor is cooled down to room temperature and the product is removed from the reactor. The resulting Pt nanoparticle dispersion exhibited a narrow Pt size distribution (1-3 nm) with a yield of 82% fully reduced Pt. The resulting colloidal nanoparticle dispersion is centrifuged at 4000 rpm for 10 min, after which time no precipitation is observed, thus indicating that this colloidal Pt nanoparticle dispersion is shelf-stable (can be stored) for more than 6 months without precipitation. See FIG. 3 for a TEM image of Pt nanoparticles prepared using PVP as stabilizer and ascorbic acid as reactant, as prepared according to this Example 1.

Example 2

Synthesis of Chloride- and Sodium-Free Colloidal Pt Nanoparticles Using Polyvinylpyrrolidone (PVP) as the Stabilizer and Ascorbic Acid as the Reducing Agent A PVP solution (5 g of a 0.02 M solution), 3.97 g of Pt-ammine solution (12.61 wt. % Pt) and 69.95 g of $H_2O$ are mixed for about 30 minutes, then 7.69 g of ascorbic acid solution (1M) is added to the mixture with stirring and mixed for about 25 minutes. The resulting mixture is transferred to a Teflon-lined autoclave and heated without stirring in a gravity convection oven at 85° C. for 12 hours. After this time, the reactor is cooled to room temperature and then the product is removed from the reactor. A stable colloidal 0.5% Pt nanoparticle dispersion is obtained with a narrow particle size distribution of 1-3 nm.

Example 3

Synthesis of Chloride- and Sodium-Free Colloidal Pt Nanoparticles Using PVP as the Stabilizer and Glucose as the Reducing Agent (PVP/Pt (w/w)=4/1 and Glucose/Pt (mole/mole)=3/1)

Figure 4:
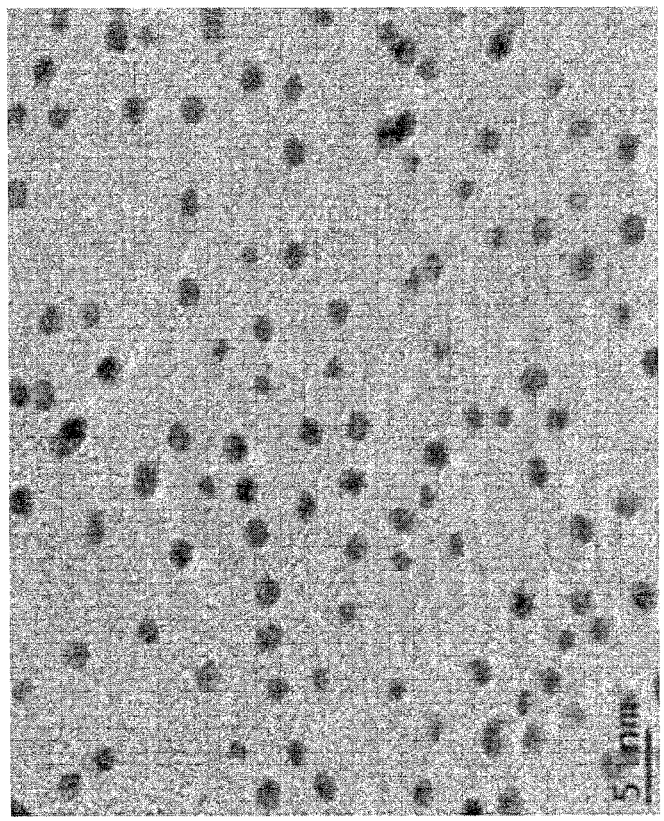
FIG. 4 is a TEM image of Pt nanoparticles prepared using PVP as stabilizer and glucose as the reducing agent.

A PVP solution (40 g of 0.02 M PVP solution), 15.86 g of Pt-ammine solution (12.61 wt. % Pt) and 13.39 g of $H_2O$ are mixed for about 30 min, then 30.75 g of glucose solution is added to the above mixture with stirring and mixed for about 25 min. The resulting mixture is transferred into a Teflon-lined autoclave and heated without stirring in a gravity convection oven at 125° C. for 12 h. After this time, the reactor is cooled to room temperature and then the product is removed from the reactor. Stable colloidal Pt nanoparticles are obtained with narrow particle size distribution of 1 to 3 nm. See FIG. 4, providing a TEM image of Pt nanoparticles prepared using PVP as a stabilizer and glucose as a reducing agent prepared according to this Example 3.

Example 4

Figure 5:
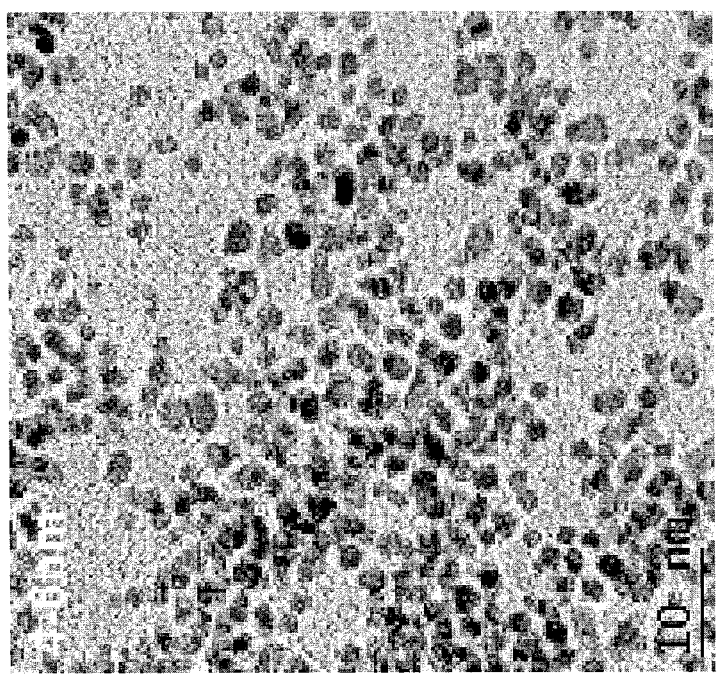
FIG. 5 is a TEM image of mono-dispersed Pt nanoparticles prepared using ethylene glycol as the reducing agent.

Synthesis of ~5 nm Monodisperse Pt Nanoparticles Using PVP as the Stabilizer and Ethylene Glycol as the Reducing Agent In a method for synthesizing 100 g of 2% Pt colloidal Pt nanoparticle dispersion, 20.00 g of PVP solution (20 g of a 0.02 M PVP solution) and 12.03 g of Pt-ammine solution (12.61 wt. % Pt) and 42.97 g of $H_2O$ are mixed for about 30 min, then 25.00 g of ethylene glycol is added to the above mixture with stirring and mixed for about 25 min. The resulting mixture is subsequently transferred into a Teflon-lined static autoclave and heated in a gravity convection oven at 125° C. for about 5 h. After that time, the autoclave is cooled to room temperature and the product is removed from the autoclave. Approximately 5 nm monodisperse Pt nanoparticles are obtained. The yield of Pt nanoparticles can be as high as 99%. See FIG. 5, which provides a TEM image of monodisperse Pt nanoparticles prepared using PVP as the stabilizer and ethylene glycol as the reducing agent according to this Example 4.

Example 5

Example 5A

Comparative

Figure 6B:
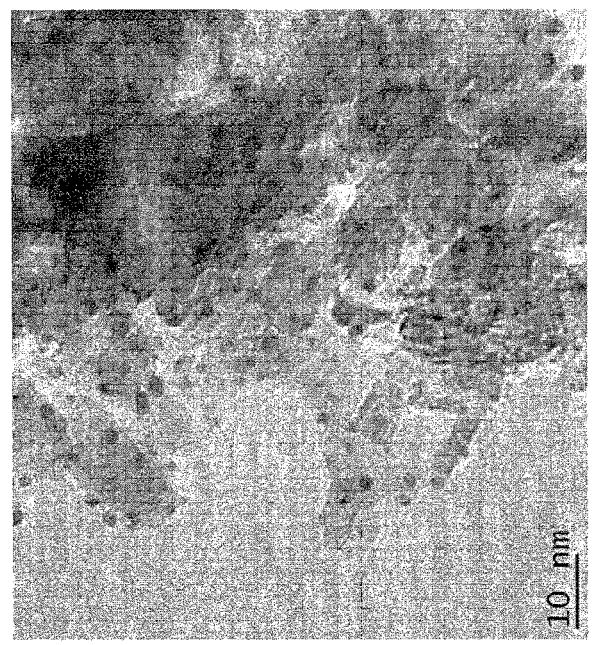
FIG. 6B is a TEM image of a calcined washcoat prepared using a colloidal Pt nanoparticle dispersion.
Figure 6A:
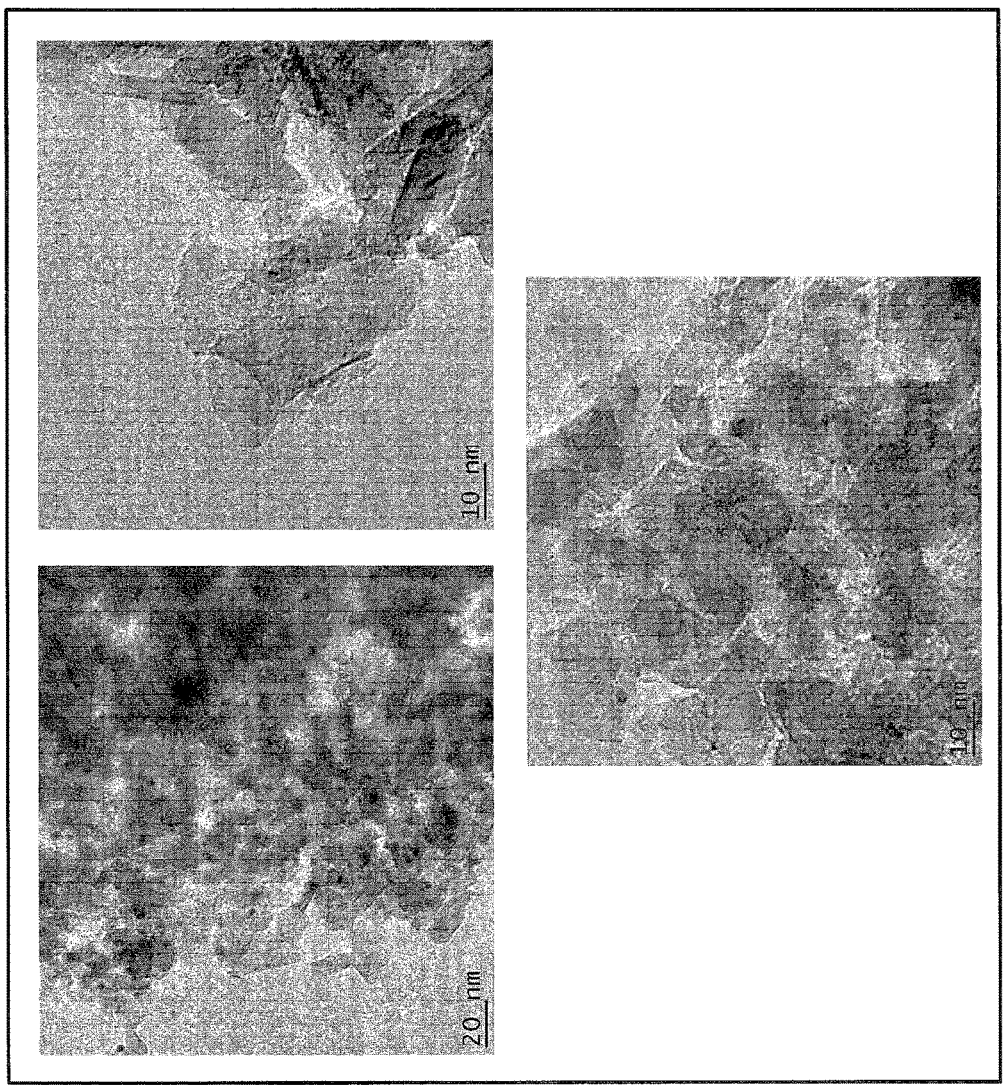
FIG. 6A is a series of TEM images of a calcined washcoat prepared using a conventional soluble Pt precursor ($Pt(NH_3)_4(OH)_2$)

A cordierite substrate with 400 cell density was coated with an acidic (pH=4.5) slurry of 1.5% $SiO_2$—$Al_2O_3$ support material to achieve 1.0 g/in³ washcoat loading. After drying at 110° C./2 hour and calcination at 450° C./1 hour, the coated substrate was dipped into a $Pt(NH_3)_4(OH)_2$ solution with predetermined concentration calculated based on the amount of Pt needed and the amount of water the coated substrate absorbs; excess liquid was blown off of the coated substrate, the wet sample was quick dried with a hot-air gun, and was then calcined at 450° C. for 1 hour in air. The final Pt loading was 20 g/ft$^3$. The resulting material exhibits a significant number of 0-1 nm Pt particles and a bimodal distribution of particle sizes, as shown in FIG. 6A.

Example 5B

Inventive

A substrate coated with 1.0 g/in$^3$ Si—Al$_2$O$_3$ material was prepared similarly as in Example 5A. The coated sample was dipped into the colloidal Pt nanoparticle dispersion of Example 1; excess liquid was blown off of the coated substrate, the wet sample was quick dried with a hot gun, and was then calcined at 450° C. for 1 hour in air. The final Pt loading was 20 g/ft$^3$. The resulting material comprises Pt particles of 1-3 nm, as shown in FIG. 6B.

Testing

Figure 7:
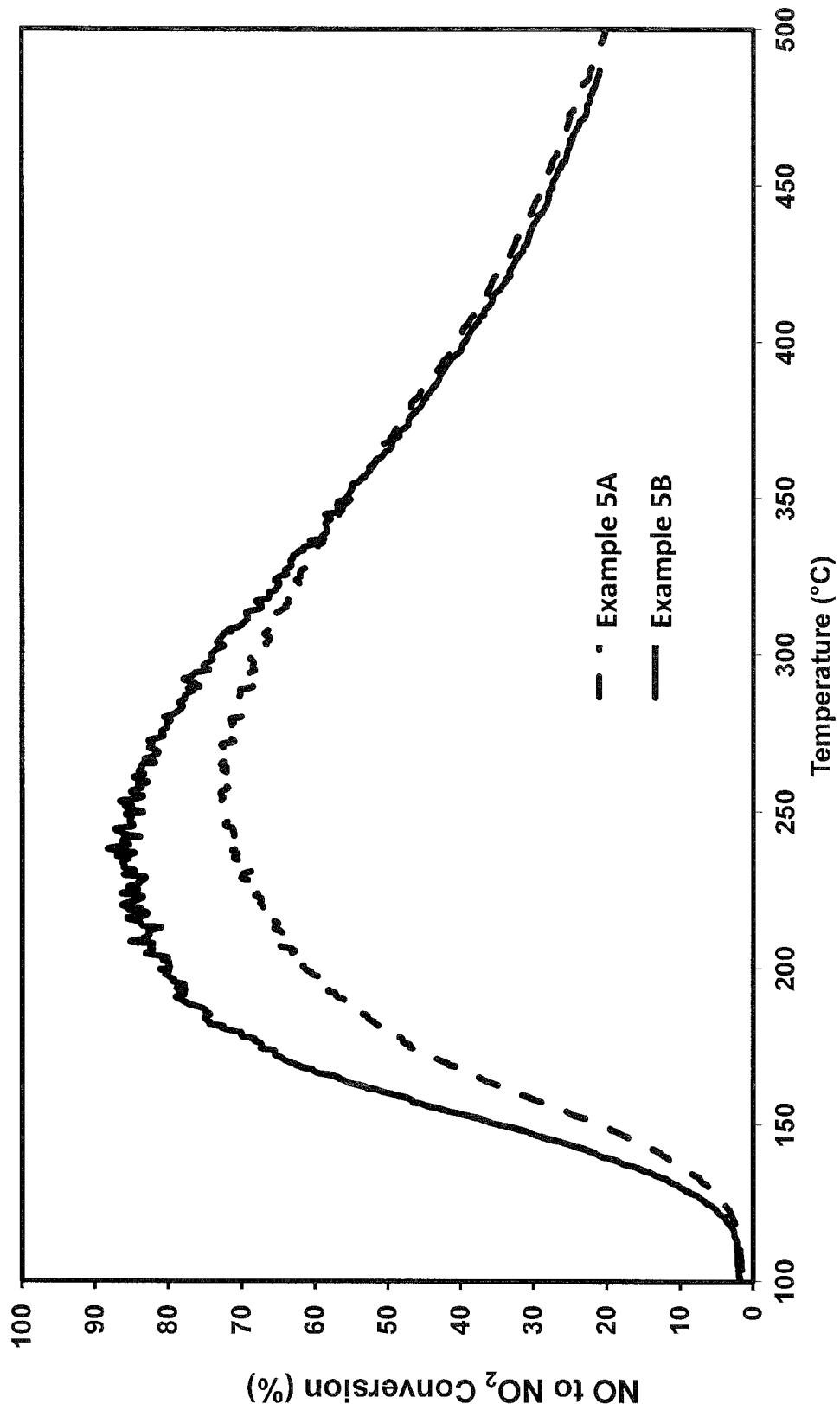
FIG. 7 provides a comparison of NO to $NO_2$ conversion percentage at various temperatures achieved using a catalytic article prepared using a Pt complex solution and a catalytic article prepared using a colloidal Pt solution.
Figure 8B:
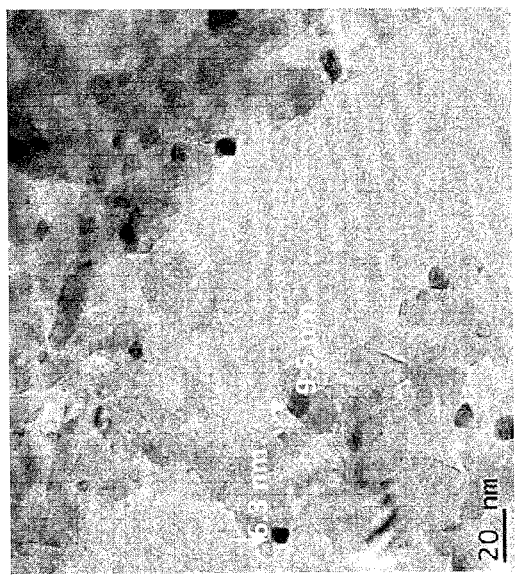
FIG. 8B is a set of TEM images of a calcined washcoat prepared using a colloidal Pt nanoparticle dispersion after aging.
Figure 8B:
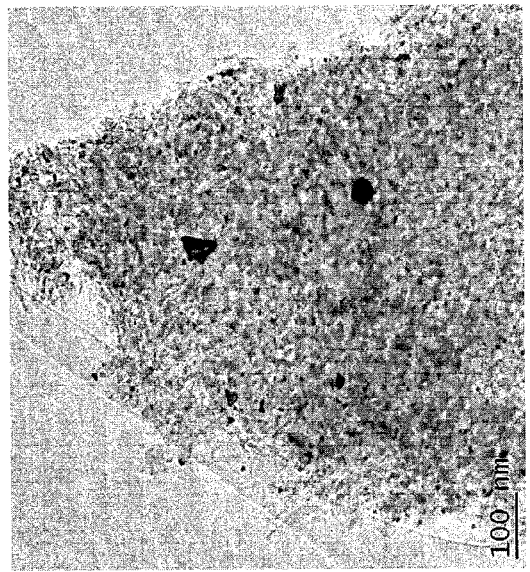
Figure 8A:
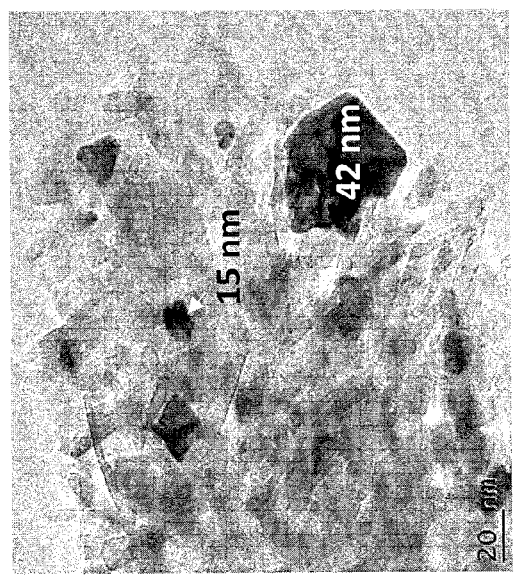
FIG. 8A is a set of TEM images of a calcined washcoat prepared using a conventional Pt precursor ($Pt(NH_3)_4(OH)_2$) after aging.
Figure 8A:
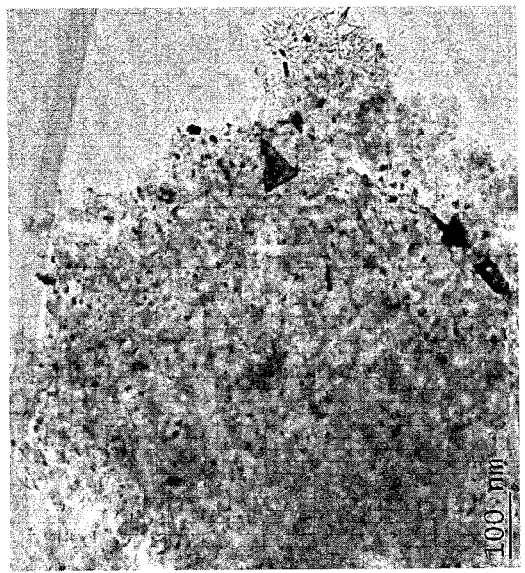

The comparative and inventive materials of Examples 5A and 5B were treated in an NO light-off gas mixture (NO 500 ppm; CO 100 ppm; C$_3$H$_6$ 10 ppm; 10%O$_2$, 7%H$_2$O; 5% CO$_2$; SV 50K/h) at 500° C. for 1 h prior to NO light-off tests from 100° C. to 500° C. As shown in FIG. 7, the coated substrate of Example 5B showed significantly higher NO to NO$_2$ conversion than the coated substrate of Example 5A. Both coated substrates were then subjected to hydrothermal aging at 550° C./50 hours in 10% steam in air, and tested as above. As shown in FIG. 8, after hydrothermal aging, the coated substrate of Example 5A (prepared using a non-colloidal, Pt complex solution) exhibited very large Pt particles (e.g., particle sizes up to about 100 nm, FIG. 8A), whereas the coated substrate of Example 5B (prepared using a colloidal Pt nanoparticle dispersion) exhibited fewer large particles; however, particles with particle sizes up to about 80 nm, FIG. 8B, were still observed. Both the comparative and inventive materials of Examples 5A and 5B sinter significantly upon aging. The inventive material of Example 5B exhibits less overall sintering.

Figure 9:
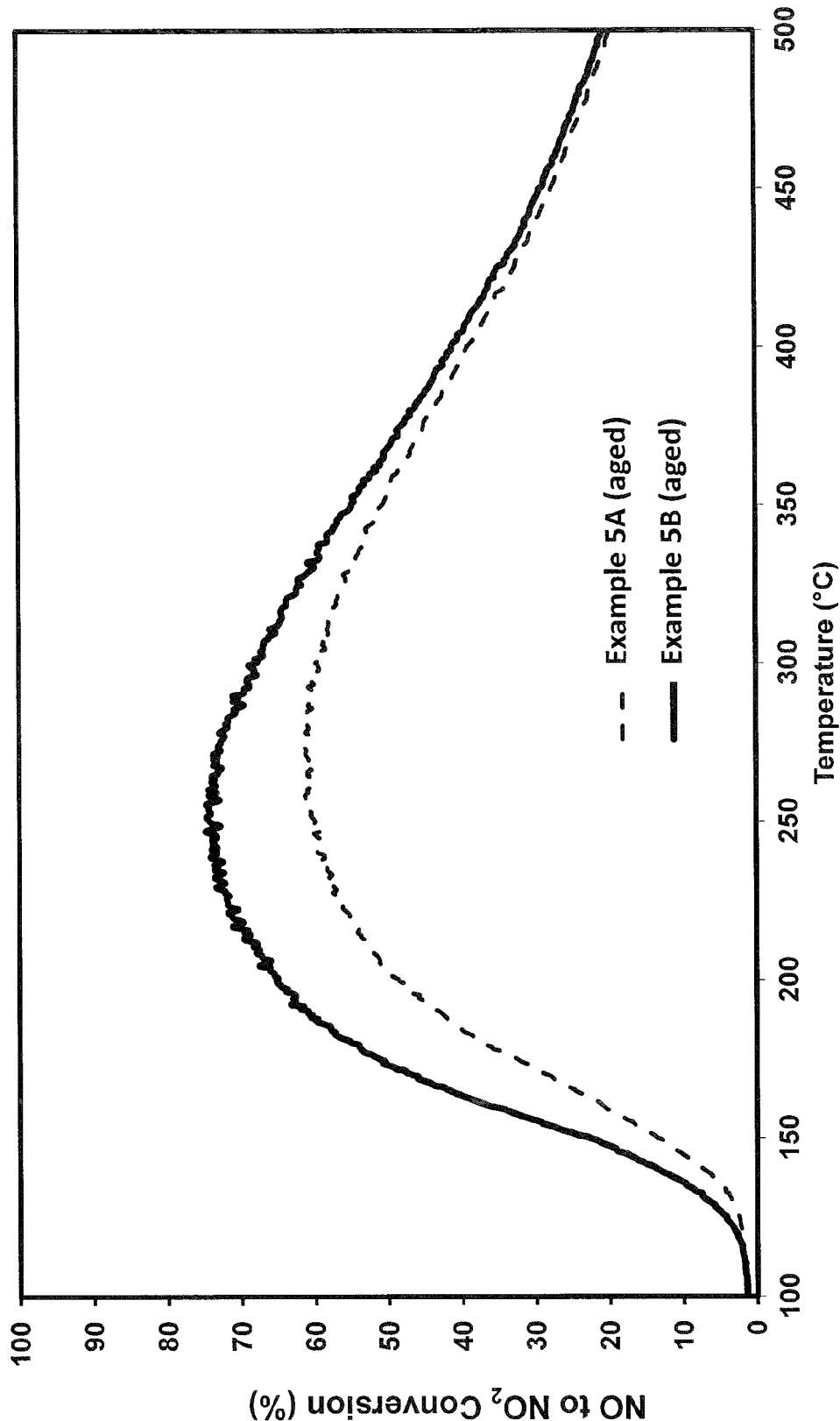
FIG. 9 provides a comparison of NO to $NO_2$ conversion percentage at various temperatures achieved using an aged catalytic article prepared using a Pt complex solution and an aged catalytic article prepared using a colloidal Pt solution.

As shown in FIG. 9, even after hydrothermal aging, the advantage exhibited by the coated substrate of Example 5B remains, as the NO to NO$_2$ conversion achieved with this coated substrate is higher than that achieved with the comparative coated substrate of Example 5A.

Example 6

Example 6A

Comparative

A doped 1.5% SiO$_2$—Al$_2$O$_3$ material was incipient wetness impregnated with a diluted Pt ammine complex solution, and the resulting material was added into deionized (DI) water to form a slurry suspension. The pH of the slurry suspension was adjusted to 4-5 with diluted HNO$_3$. The slurry was milled to D90=12-15 and an alumina binder material at a loading of 2.5 wt. % of the 1.5% SiO$_2$—Al$_2$O$_3$ material was added. The slurry was then coated at 30-45% solid content onto a 400/4 honeycomb substrate. After drying, the catalyst-coated substrate was calcined at 450° C. for 1 hour in air. The resulting washcoat loading was 1.037 g/in$^3$, and the Pt loading was 20 g/ft$^3$.

Example 6B

Inventive

A doped 1.5% SiO$_2$—Al$_2$O$_3$ material was added into DI water to form a slurry suspension and the pH of the slurry suspension was adjusted to 4-5 with diluted HNO$_3$. The slurry was milled to D90=12-15 and the quantity of colloidal Pt solution of Example 1 was added to the milled slurry, so as to create the same Pt loading as Example 6A, followed by a alumina binder material at a loading of 2.5 wt. % of the 1.5% SiO$_2$—Al$_2$O$_3$ material. The slurry was then coated onto a 400/4 honeycomb substrate and calcined as described in Example 8A. Alternatively, the doped 1.5% SiO$_2$—Al$_2$O$_3$ support material could be directly added into a diluted solution of colloidal Pt prior to any milling. This modification is particularly useful at high Pt loading and when the Pt concentration in the colloidal precursor is low.

Testing

Figure 10:
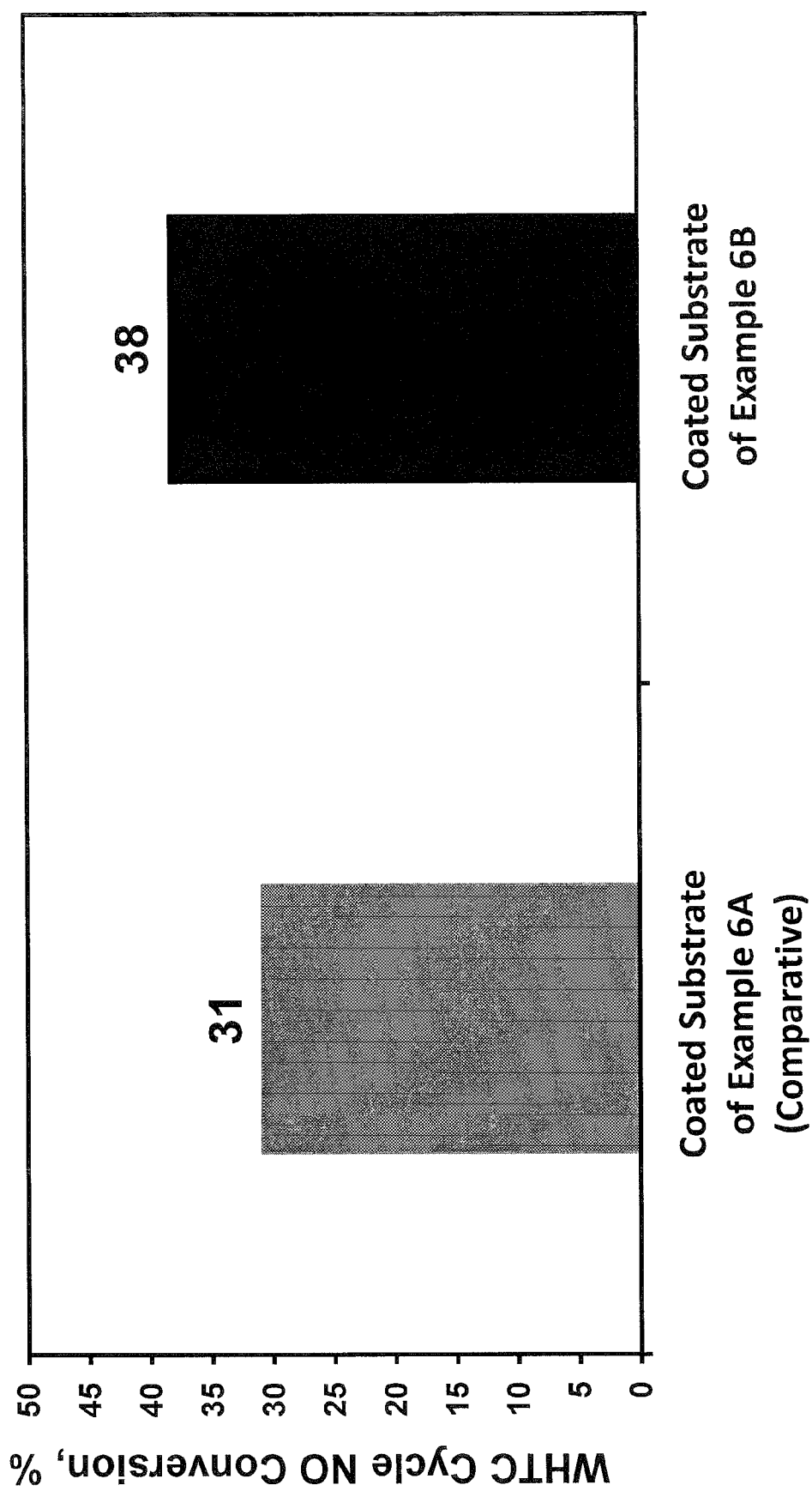
FIG. 10 provides a comparison of NO conversion percentage achieved using a catalytic article prepared using a Pt complex solution and a catalytic article prepared using a colloidal Pt solution.

The coated honeycomb substrates of Examples 6A and 6B were aged on a diesel engine at 550° C. continuously for 100 hours, and evaluated on a transient diesel lab reactor simulating the engine out condition of a Euro 6 calibrated engine (average temperature of the simulated World Harmonized Test Cycle (WHTC), 225° C.). The NO to NO$_2$ conversion achieved with the coated substrates of Examples 6A and 6B is compared in FIG. 10. The coated substrate of Example 6B (prepared using a colloidal Pt dispersion) shows 7% higher NO conversion than the coated substrate of Example 6A (prepared using a non-colloidal, Pt complex solution).

Example 7

Example 7A

Comparative

A doped 14% SiO$_2$—TiO$_2$ material was incipient wetness impregnated with a diluted Pt ammine complex solution, then added into DI water to form a slurry suspension. The pH of the slurry suspension was adjusted to 4-5 with diluted HNO$_3$. The slurry was milled to D90=12-15 and a silica binder material at a loading of 2.5 wt. % of the 14% SiO$_2$TiO$_2$ material was added. The slurry was then coated at 25-30% solid content onto a 400/4 honeycomb substrate. After drying, the catalyst-coated substrate was calcined at 450° C. for 1 hour in air. The resulting washcoat loading was 0.774 g/in$^3$, and the Pt loading was 10 g/ft$^3$.

Example 7B

Inventive

A doped 14% SiO$_2$—TiO$_2$ material was added into the diluted colloidal Pt solution of Example 1 (diluted to achieve the desired Pt loading) to form a slurry suspension and the pH of the slurry suspension was adjusted to 4-5 with diluted HNO$_3$. The slurry was milled to D90=12-15 and a silica binder material at a loading of 2.5 wt. % of the 14% SiO$_2$—TiO$_2$ material was added The slurry was then coated at 25-29% solid content onto a 400/4 honeycomb substrate and calcined as described in Example 7A. The resulting washcoat loading was 0.774 g/in$^3$, and the Pt loading was 10 g/ft$^3$.

Testing

Figure 11:
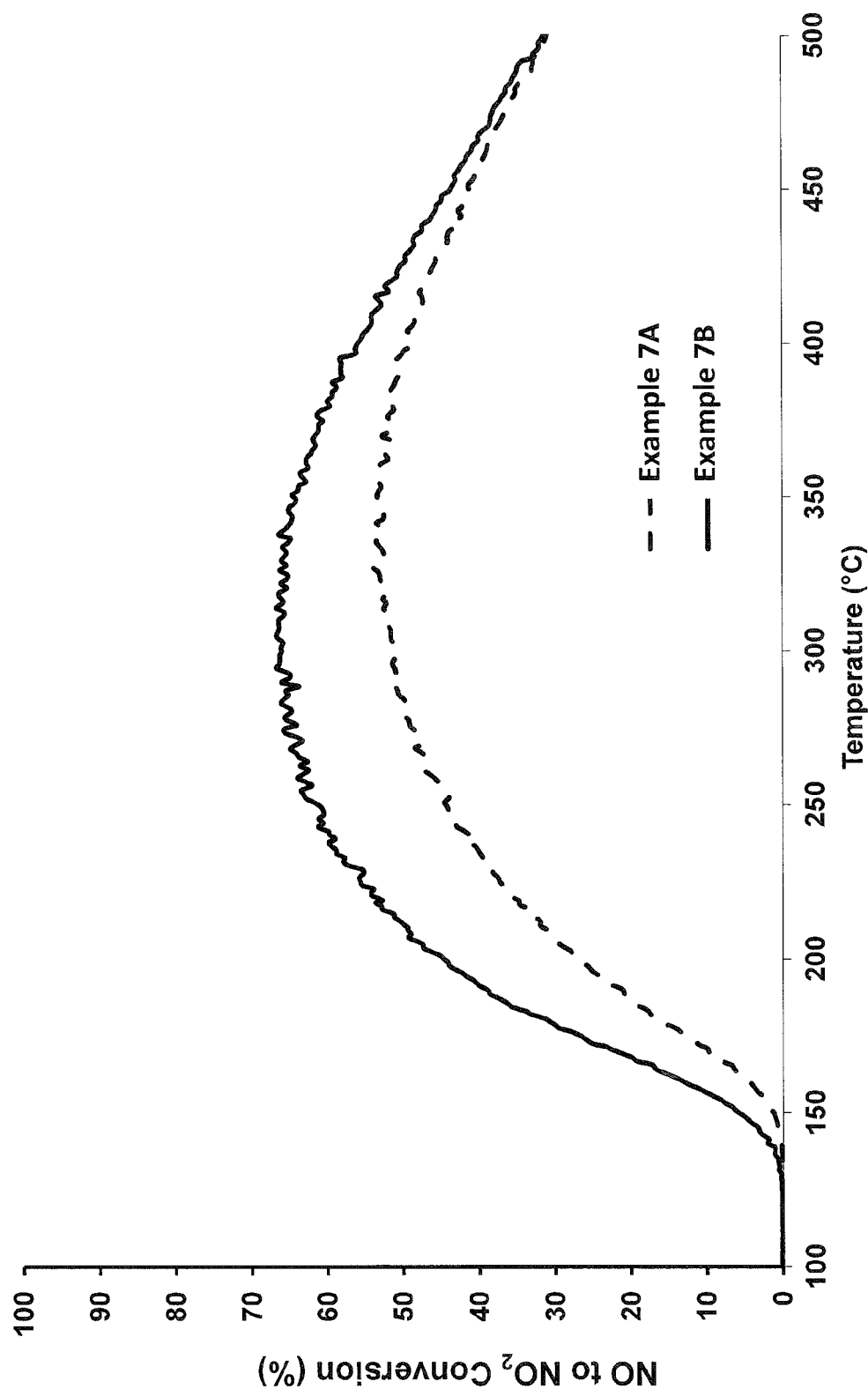
FIG. 11 provides a comparison of NO to $NO_2$ conversion percentage at various temperatures achieved using a catalytic article prepared using a Pt complex solution and a catalytic article prepared using a colloidal Pt solution.

The coated substrates of Examples 7A and 7B were aged on a diesel engine at 550° C. continuously for 100 hours, and evaluated for NO light-off under the same test conditions as for Examples 5A and 5B. As shown in FIG. 11, the coated substrate of Example 7B (prepared using a colloidal Pt dispersion) showed significantly higher $NO_2$ production than that of Example 7A (prepared using a non-colloidal, Pt complex solution).

Example 8

Example 8A

Comparative

A doped 1.5% $SiO_2$—$Al_2O_3$ material was incipient wetness impregnated with a diluted Pt ammine complex solution, and the resulting material was added to DI water to form a slurry suspension. The pH of the slurry suspension was adjusted to 4-5 with diluted $HNO_3$. The slurry was milled to D9=4-5 μm and then coated at 15-20% solid content onto a 200/12 cordierite filter substrate. After quick drying with hot air, the catalyst-coated substrate was calcined at 450° C. for 1 hour in air. The resulting washcoat loading was 0.15 g/in$^3$, and the Pt loading was 5 g/ft$^3$.

Example 8B

Inventive

A doped 1.5% $SiO_2$—$Al_2O_3$ material was added into DI water to form a slurry suspension, and the pH of the slurry suspension was adjusted to 4-5 with diluted $HNO_3$. The slurry was milled to D90=4-5 and the colloidal Pt dispersion of Example 1 was added (in an amount determined based on the desired Pt loading), the slurry was then coated onto a 200/12 cordierite filter substrate, and the coated substrate was calcined as described in Example 8A. The resulting washcoat loading was 0.15 g/in$^3$, and the Pt loading was 5 g/ft$^3$.

Testing

Figure 12:
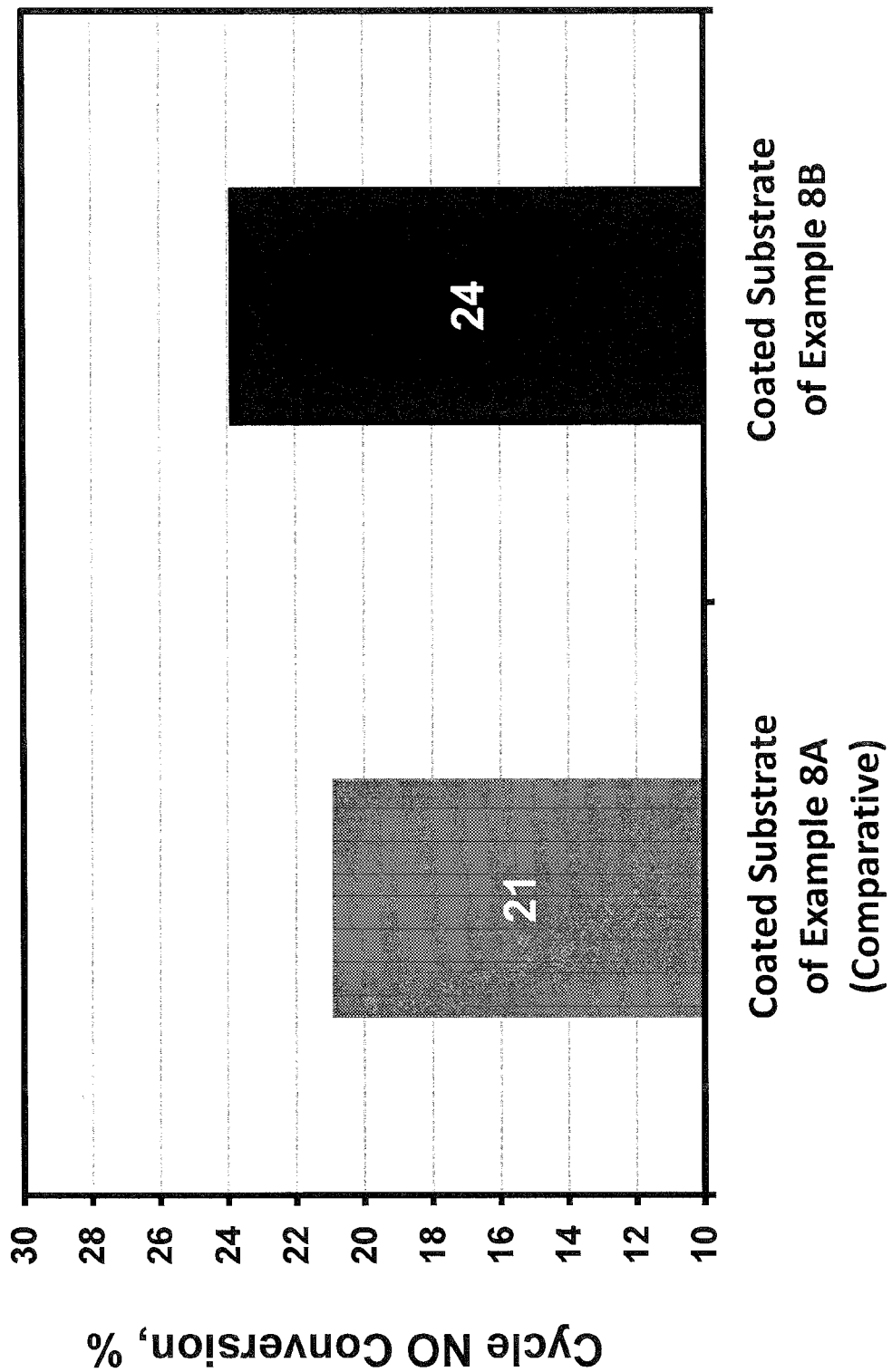
FIG. 12 provides a comparison of NO conversion percentage achieved using a catalytic article prepared using a Pt complex solution and a catalytic article prepared using a colloidal Pt solution.

The coated substrates of Examples 8A and 8B were aged at 550° C. continuously for 50 hours in air containing 10% steam, and evaluated on a diesel vehicle simulator with a World Harmonized Test Cycle (WHTC) as described for Examples 6A and 6B. The NO to $NO_2$ conversion of the catalyst coated substrates of Examples 8A and 8B is compared in FIG. 12, which shows that the NO conversion achieved using the catalyst coated substrate of Example 8B (prepared using a colloidal Pt dispersion) is 3% higher than that achieved using the catalyst coated substrate of Example 8A (prepared using a non-colloidal, Pt complex solution).

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed:

1. A diesel oxidation catalyst composition, the composition comprising:
    a plurality of platinum group metal nanoparticles selected from the group consisting of Pt, Pd, Au, Ag, Ru, Rh, Ir, Os, alloys thereof, and mixtures thereof,
    wherein about 90% or more of the platinum group metal is in fully reduced form,
    wherein the nanoparticles have an average particle size of about 1 to about 10 nm and at least about 90% of the nanoparticles have a particle size of +/− about 2 nm of the average particle size; and, optionally,
    a refractory metal oxide material.
2. The diesel oxidation catalyst composition of claim 1, wherein at least about 90% of the nanoparticles have a particle size+/− about 1 nm of the average particle size.
3. The diesel oxidation catalyst composition of claim 1, wherein at least about 95% of the nanoparticles have a particle size+/−2 nm of the average particle size.
4. The diesel oxidation catalyst composition of claim 1, wherein at least about 95% of the nanoparticles have a particle size+/− about 1 nm of the average particle size.
5. The diesel oxidation catalyst composition of claim 1, wherein the average particle size of the nanoparticles is about 2 to about 3 nm.
6. The diesel oxidation catalyst composition of claim 1, wherein the average particle size of the nanoparticles is about 3 to about 5 nm.
7. The diesel oxidation catalyst composition of claim 1, wherein the average particle size of the nanoparticles is about 5 to about 7 nm.
8. The diesel oxidation catalyst composition of claim 1, wherein the average particle size of the nanoparticles is about 7 to about 9 nm.
9. The diesel oxidation catalyst composition of claim 1, wherein the composition does not comprise halides, alkali metals, alkaline-earth metals, sulfur compounds, or boron compounds.
10. The diesel oxidation catalyst composition of claim 1, wherein the composition does not comprise boron or sodium.
11. The diesel oxidation catalyst composition of claim 1, wherein the platinum group metal nanoparticles comprise platinum.
12. The diesel oxidation catalyst composition of claim 1, wherein the refractory metal oxide is selected from the group consisting of alumina, silica, zirconia, titania, ceria, and physical mixtures or chemical combinations thereof.
13. The diesel oxidation catalyst composition of claim 1, wherein the refractory metal oxide is a silica-doped alumina, silica-doped titania, or silica-doped zirconia.
14. The diesel oxidation catalyst composition of claim 13, wherein the refractory metal oxide comprises 1-10% $SiO_2$-doped $Al_2O_3$, 1-20% $SiO_2$-doped $TiO_2$, or 1-30% $SiO_2$-doped $ZrO_2$.
15. The diesel oxidation catalyst composition of claim 13, wherein the refractory metal oxide comprises 1% $SiO_2$-doped $Al_2O_3$ or 8-14% $SiO_2$-doped $TiO_2$.
16. A diesel oxidation catalyst article, comprising a substrate having a coating comprising the diesel oxidation catalyst composition of claim 1 disposed thereon.
17. The diesel oxidation catalyst article of claim 16, wherein the refractory metal oxide material is present as a layer overlying the substrate and positioned between the substrate and the coating.
18. A method of treating an exhaust stream from a diesel engine, comprising passing the exhaust stream through the diesel oxidation catalyst article of claim 16 such that NO is oxidized within the catalyst article.

19. An emission treatment system for treatment of an exhaust gas stream, the emission treatment system comprising:
- a diesel engine producing an exhaust gas stream;
- a diesel oxidation catalyst article according to claim 16 positioned in fluid communication with the exhaust gas stream and adapted for oxidation of carbon monoxide and hydrocarbon gases within the exhaust stream to form a treated exhaust gas stream; and
- at least one additional catalyst article downstream from the diesel oxidation catalyst article and in fluid communication with the treated exhaust gas stream, the at least one additional catalyst article adapted for ammonia oxidation, particulate filtration, NOx storage, NOx trapping, selective catalytic reduction of NOx, or combinations thereof.

20. A catalyzed soot filter article, comprising a substrate having a coating comprising the diesel oxidation catalyst composition of claim 1 disposed thereon.

21. A method of making a catalyst article comprising platinum group metal nanoparticles, comprising:
- applying a refractory metal oxide slurry and a colloidal dispersion comprising platinum group metal nanoparticles chosen from the group consisting of Pt, Pd, Au, Ag, Ru, Rh, Ir, Os, alloys thereof, and mixtures thereof to a substrate;
- wherein about 90% or more of the platinum group metal is in fully reduced form;
- wherein the nanoparticles have an average particle size of about 1 to about 10 nm; and
- wherein at least about 90% of the nanoparticles have a particle size of +/− about 2 nm of the average particle size.

22. The method of claim 21, wherein the catalyst article is a diesel oxidation catalyst article or a catalyzed soot filter article.

23. The method of claim 21, further comprising calcining the coated substrate after the applying step.

24. The method of claim 21, further comprising forming a washcoat slurry comprising the refractory metal oxide slurry in water and the colloidal dispersion and applying the refractory metal oxide slurry and the colloidal dispersion to the substrate in the form of the washcoat.

25. The method of claim 21, comprising:
- applying the refractory metal oxide slurry to the substrate;
- calcining the refractory metal oxide coating on the substrate; and
- thereafter applying the colloidal dispersion overlying the calcined refractory metal oxide coating.

26. The method of claim 21, wherein the platinum group metal nanoparticles comprise platinum.

27. The method of claim 21, wherein the refractory metal oxide is selected from the group consisting of alumina, silica, zirconia, titania, ceria, and physical mixtures or chemical combinations thereof.

28. The method of claim 21, wherein the refractory metal oxide is a silica-doped alumina, silica-doped titania, or silica-doped zirconia.

29. The method of claim 21, wherein the refractory metal oxide comprises 1-10% $SiO_2$-doped $Al_2O_3$, 1-20% $SiO_2$-doped $TiO_2$, or 1-30% $SiO_2$-doped $ZrO_2$.

30. The method of claim 21, wherein the refractory metal oxide comprises 1% $SiO_2$-doped $Al_2O_3$ or 8-14% $SiO_2$-doped $TiO_2$.

31. The method of claim 21, wherein at least about 90% of the nanoparticles have a particle size+/− about 1 nm of the average particle size.

32. The method of claim 21, wherein at least about 95% of the nanoparticles have a particle size+/−2 nm of the average particle size.

33. The method of claim 21, wherein at least about 95% of the nanoparticles have a particle size+/− about 1 nm of the average particle size.

34. The method of claim 21, wherein the average particle size of the nanoparticles is about 2 to about 3 nm.

35. The method of claim 21, wherein the average particle size of the nanoparticles is about 3 to about 5 nm.

36. The method of claim 21, wherein the average particle size of the nanoparticles is about 5 to about 7 nm.

37. The method of claim 21, wherein the average particle size of the nanoparticles is about 7 to about 9 nm.

38. The method of claim 21, wherein the coating does not comprise halides, alkali metals, alkaline-earth-metals, sulfur compounds, and boron compounds.

39. The method of claim 21, further comprising aging the catalyst article by subjecting the article to heat treatment at 550-600° C. wherein at least about 50% of the PGM particles after aging have diameters of about 1 to 50 nm.

40. The method of claim 21, further comprising aging the catalyst article by subjecting the article to heat treatment at 550-600° C. wherein at least about 75% of the PGM particles after aging have diameters of about 1 to 50 nm.

41. The method of claim 21, further comprising aging the catalyst article by subjecting the article to heat treatment at 550-600° C. wherein at least about 50% of the PGM particles after aging have diameters of about 1 to 25 nm.

42. The method of claim 21, further comprising preparing the platinum group metal nanoparticles by a method comprising:
- a) preparing a solution of platinum group metal precursors selected from salts of a metal selected from the group consisting of Pt, Pd, Au, Ag, Ru, Rh, Ir, Os and alloys thereof in the presence of a dispersion medium and a water soluble polymer suspension stabilizing agent, wherein the platinum group metal precursors do not comprise halides, alkali metals, alkaline-earth metals, sulfur compounds, and boron compounds; and
- b) combining the solution with a reducing agent to provide a platinum group metal nanoparticle colloidal dispersion 'wherein the nanoparticle concentration is at least about 2 wt. % of the total weight of the colloidal dispersion' and wherein at least about 90% of the platinum group metal in the colloidal dispersion is in fully reduced form.

* * * * *

UNITED STATES PATENT AND TRADEMARK OFFICE
CERTIFICATE OF CORRECTION

PATENT NO. : 10,974,198 B2
APPLICATION NO. : 16/068418
DATED : April 13, 2021
INVENTOR(S) : Wei et al.

It is certified that error appears in the above-identified patent and that said Letters Patent is hereby corrected as shown below:

In the Claims

Claim 2, Column 30, Line 13, "particle size+/– about" should read --particle size +/– about--.

Claim 3, Column 30, Line 20, "particle size+/–2 nm" should read --particle size +/– 2 nm--.

Claim 4, Column 30, Line 20, "particle size+/– about" should read --particle size +/– about--.

Claim 31, Column 32, Line 8, "particle size+/– about" should read --particle size +/– about--.

Claim 32, Column 32, Line 11, "particle size+/–2 nm" should read --particle size +/– 2 nm--.

Claim 33, Column 32, Line 15, "particle size+/– about" should read --particle size +/– about--.

Claim 42, Column 32, Line 53, "dispersion 'wherein" should read --dispersion, wherein--.

Claim 42, Column 32, Line 55, "dispersion' and" should read --dispersion, and--.

Signed and Sealed this
Seventh Day of September, 2021

Drew Hirshfeld
*Performing the Functions and Duties of the
Under Secretary of Commerce for Intellectual Property and
Director of the United States Patent and Trademark Office*